United States Patent [19]
Anderson et al.

[11] Patent Number: 5,974,396
[45] Date of Patent: Oct. 26, 1999

[54] METHOD AND SYSTEM FOR GATHERING AND ANALYZING CONSUMER PURCHASING INFORMATION BASED ON PRODUCT AND CONSUMER CLUSTERING RELATIONSHIPS

[75] Inventors: Michael W. Anderson, West Seneca; David Hargreaves, North Tonawanda; Susan M. Hoellig, Boston, all of N.Y.; Drew S. Johnson, Wexford, Pa.; Blaine D. Mischel, Buffalo, N.Y.

[73] Assignee: Moore Business Forms, Inc., Grand Island, N.Y.

[21] Appl. No.: 08/683,906

[22] Filed: Jul. 19, 1996

Related U.S. Application Data

[63] Continuation of application No. 08/021,105, Feb. 23, 1993, abandoned.

[51] Int. Cl.⁶ .................................................. G06F 17/60
[52] U.S. Cl. ................................................ 705/10; 705/14
[58] Field of Search ............................. 705/14, 1, 7, 10, 705/16; 235/375, 383, 380, 381; 186/35, 52, 59, 61

[56] References Cited

U.S. PATENT DOCUMENTS

| | | |
|---|---|---|
| 4,355,372 | 10/1982 | Johnson et al. . |
| 4,752,675 | 6/1988 | Zetmeir ................................... 235/375 |
| 4,872,113 | 10/1989 | Dinerstein . |
| 4,908,761 | 3/1990 | Tai .......................................... 364/402 |
| 5,227,874 | 7/1993 | Von Kohorn ............................ 364/402 |
| 5,430,644 | 7/1995 | Deaton et al. ........................... 364/401 |
| 5,615,342 | 3/1997 | Johnson . |

FOREIGN PATENT DOCUMENTS

90/11587  10/1990  WIPO .

OTHER PUBLICATIONS

"Who's Holding the Best Cards?", Direct Marketing, May 1991, Murray Raphel pp. 54–55.
"Why They Buy", American Demographics, Mar. 1989, Joe Schwartz pp. 40–41.

(List continued on next page.)

*Primary Examiner*—Robert A. Weinhardt
*Attorney, Agent, or Firm*—Nixon & Vanderhye P.C.

[57] ABSTRACT

A method and system for gathering and analyzing customer and purchasing information permits a retailer or retail chain to process transactional information involving large numbers of consumers and consumer products. Product information is gathered that uniquely identifies a specific product by type and manufacturer and grouped into generic product clusters. Consumers are similarly grouped into consumer clusters based on common consumer demographics and other characteristics. Consumer retail transactions are analyzed in terms of product and/or consumer clusters to determine relationships between the consumers and the products. Product, consumer, and transactional data are maintained in a relational database. Targeting of specific consumers with marketing and other promotional literature is based on consumer buying habits, needs, demographics, etc. A retailer queries the database using selected criteria, accumulates data from the database in response to that query, and makes prudent business and marketing decisions based on that response. Queried information from the database may be communicated to a printing subsystem for printing promotional literature directed to particular customers based on cluster information stored in the database.

42 Claims, 15 Drawing Sheets

OTHER PUBLICATIONS

"Newspapers of the 90's" Direct Marketing, Jul. 1991, Shaun Higgins, pp. 22–24.
"The Future of Retailing" Direct Marketing, Jul. 1991, T. Keane, pp. 25–27 and 56.
Reward America, Tops Friendly Markets, May 14–Sep. 16, 1990.
"H.E.B. Promotion Uses 'Electronic Coupons'", Austin Paper, Sep. 21, 1989.
"H.E.B. Introduces A Program That Gives A Whole New Meaning To The Term Promotion", INSIDER, vol. 1, No. 1.
"With Shoppers's Passport Your Ship Is Sure To Come In", SMITTY'S.
"Home For The Holidays", Smitty's Passport News, vol. 1, No. 10, Nov. 26 thru Dec. 23, 1990.
Viata Power Platform, Viata Corporation, 1990.
Electronic Frequent Shopper Programs, Point of Scan, Jan. 1991.
Targeting the Grocery Shopper, The New York Times, May 26, 1991.
Getting Started With Your Frequent Shopper Program, Supermarket Business, Oct. 1990.
War Casts Pall Ad Spending Growth, Direct Intelligence, Direct Marketing, Jul. 1991.
The New Frontier, Direct Marketing, May 1991.
Holiday Finds a Simple Solution, Chain Store Age Executive, Greg Springer, Nov. 1989.
Smart Cards, The Next Marketing Marvel?, Incentive, Feb. 1990.
Food Fight, American Demographics, Ruth Hamel, Mar. 1989.
Farewell to Coupons? American Demographics, Jan Larson, Feb. 1990.
Man of Steel's Birthday: A Super Promotion Tie–In?, Update, Aug., 1987.
Frequent Flyers Move Over, Here Come The Frequent Shoppers, Direct Marketing, Stan Rapp, Jan. 1989.
New Wave Database, Direct Marketing, Roy Schwedelson, Mar. 1988.
Microcomputer–based Merchandising Management Systems: A New Approach, Geoffrey I. Crouch et al, International Journal of Retailing, Jul. 1988.
Database Marketing, Catalog Age, May 1988.
Dahl's: How A Combo Thrives Without Ads; DM, Jay L. Johnson, Oct. 1989.
Scanning The Future, Forbes, Oct. 15, 1990.
Retail Systems Alert, vol. 4, No. 1, Jan. 1991.
A One–Store Independent Takes On Electronic Marketing, Progressive Shopper, Michael Garry, Jun. 1991.
The Short Circuits of Electronic Marketing, Progressive Grocer, Jan. 1991.
"Prodigy Finds Shoppers Prefer Pushing Carts To Keys", Business Week, May 27, 1991, p. 104E.
"Supermarkets 2000", Progressive Shopper, Jan. 1990. p. 29.
"Not Just For The Little Guys", Direct Marketing, May 1991, pp. 20–22; 54–56.
Insider, vol. 2, #10, 1990.
Insider, vol. II, No. 21, Oct. 1990.
"Exploring Some Issues In Frequent Shopper Programs", Supermarket Business, Sep. 1989, pp. 13–15, 236.
Las Margaritas promotional brochure, 1989.
"Getting To Know Your Customers", Retail & Distribution Management, Jul./Aug. 1989–90.
"Frequent Shopper Plan Was Born In Charleston", The News & Courier/The Evening Post, May 2, 1990.

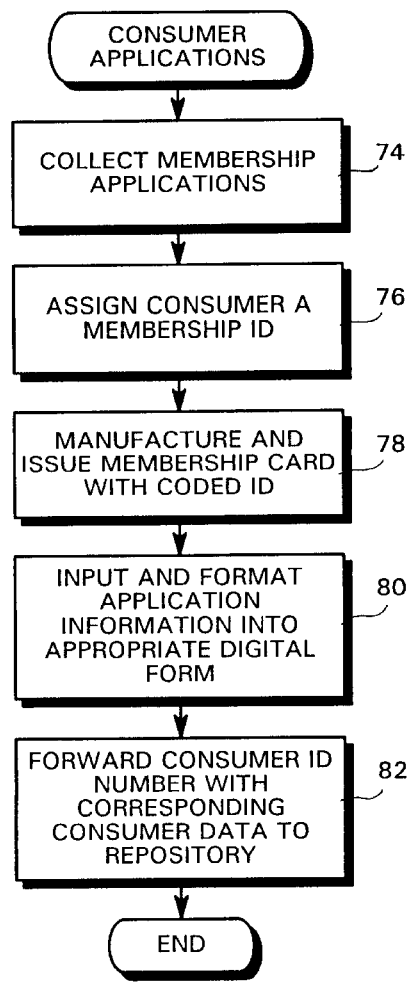
FIG. 4
FIG. 6 CLUSTER CONCEPT
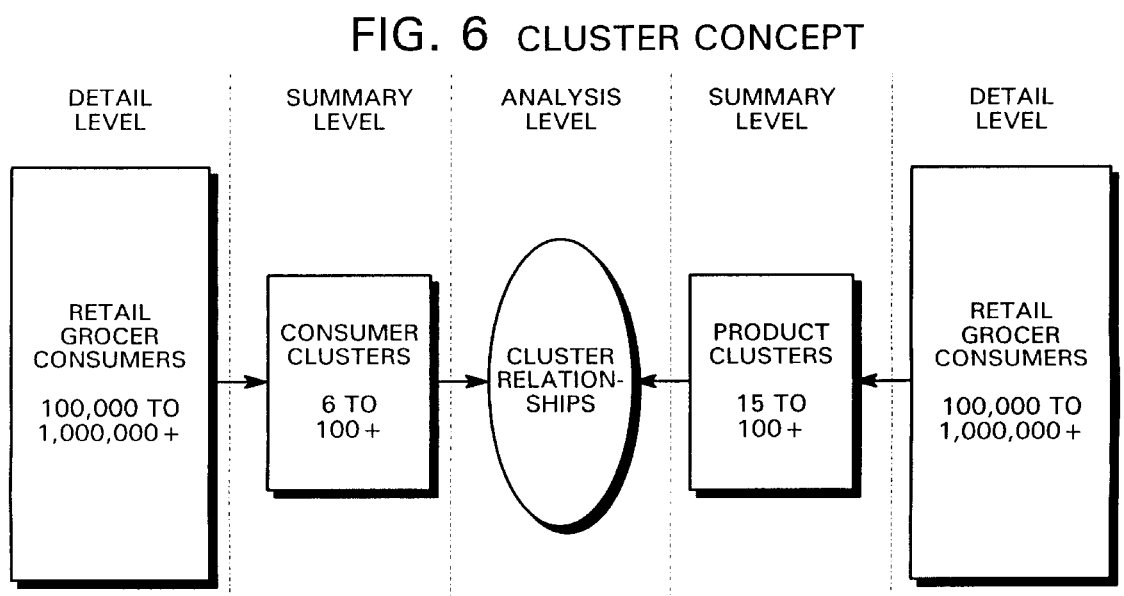

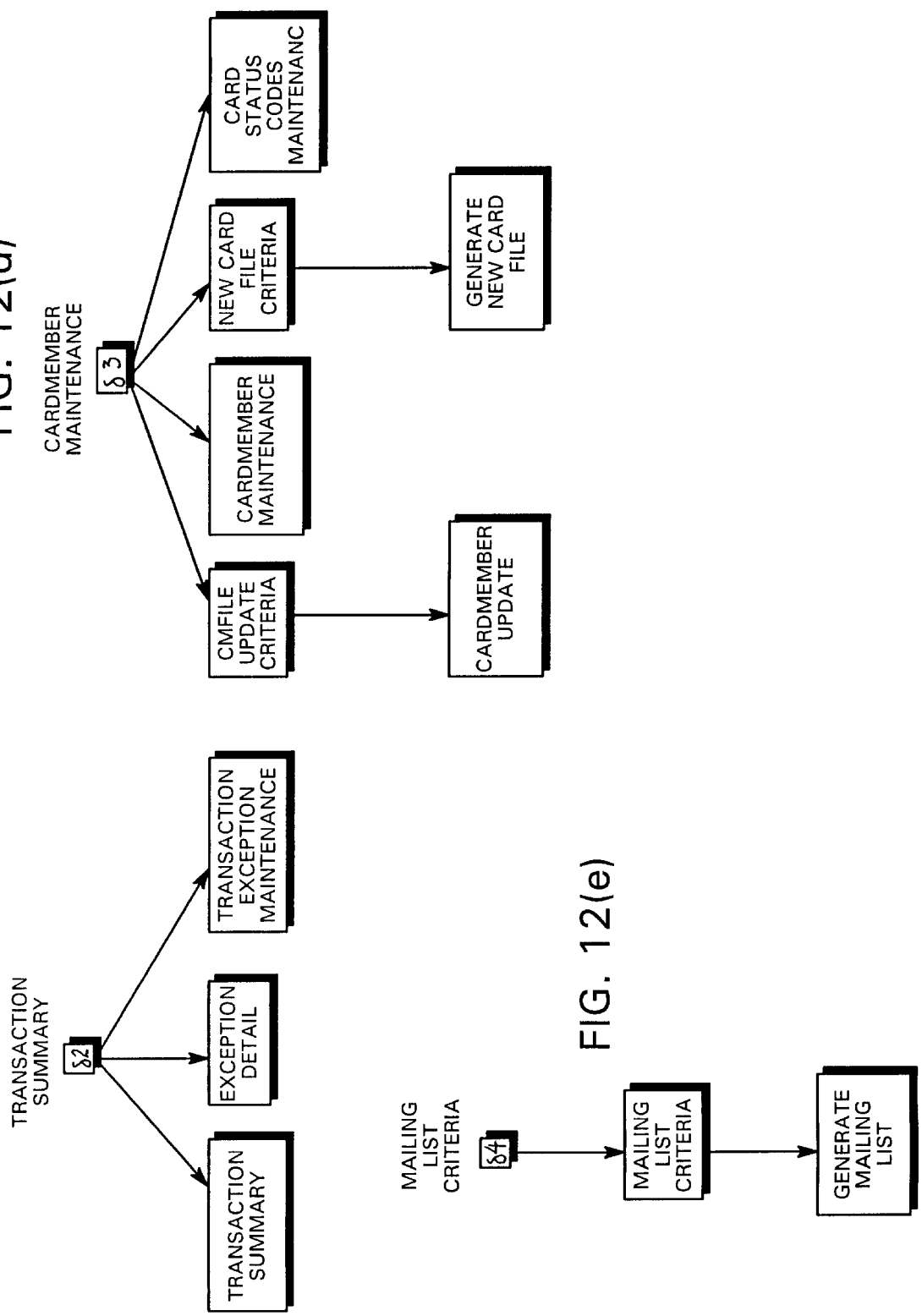

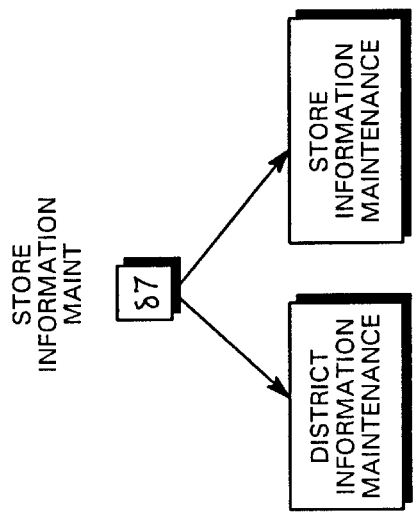
FIG. 12(h)
STORE INFORMATION MAINT
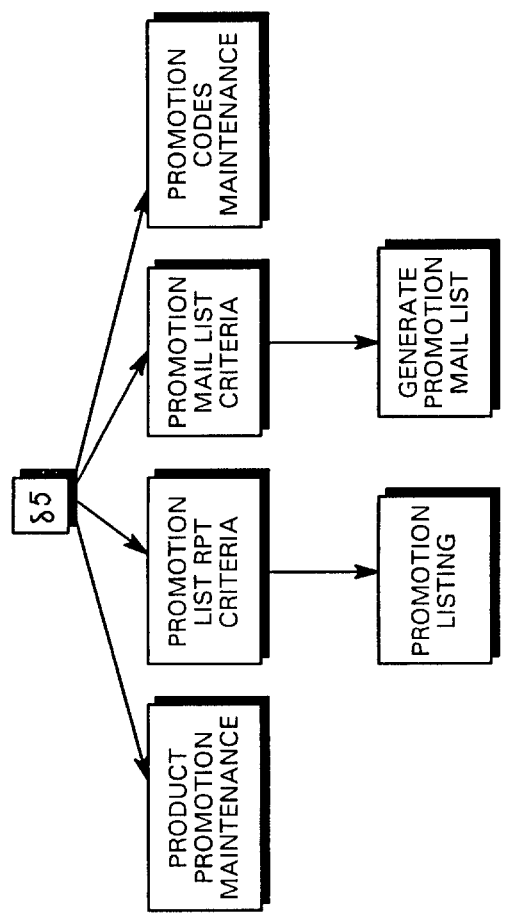
FIG. 12(f) PRODUCT PROMOTIONS
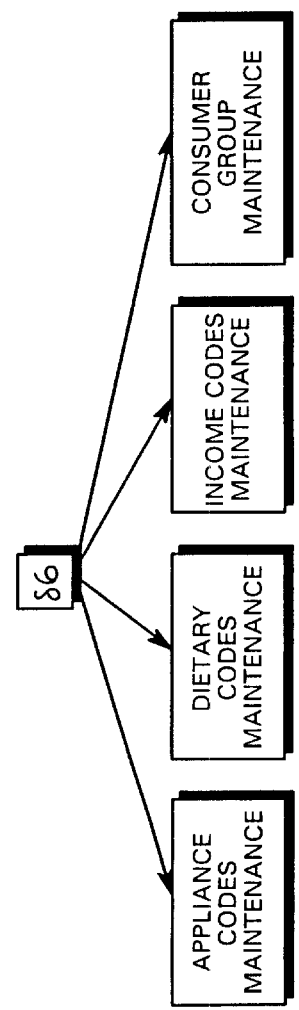
FIG. 12(g) DEMOGRAPHIC MAINTENANCE

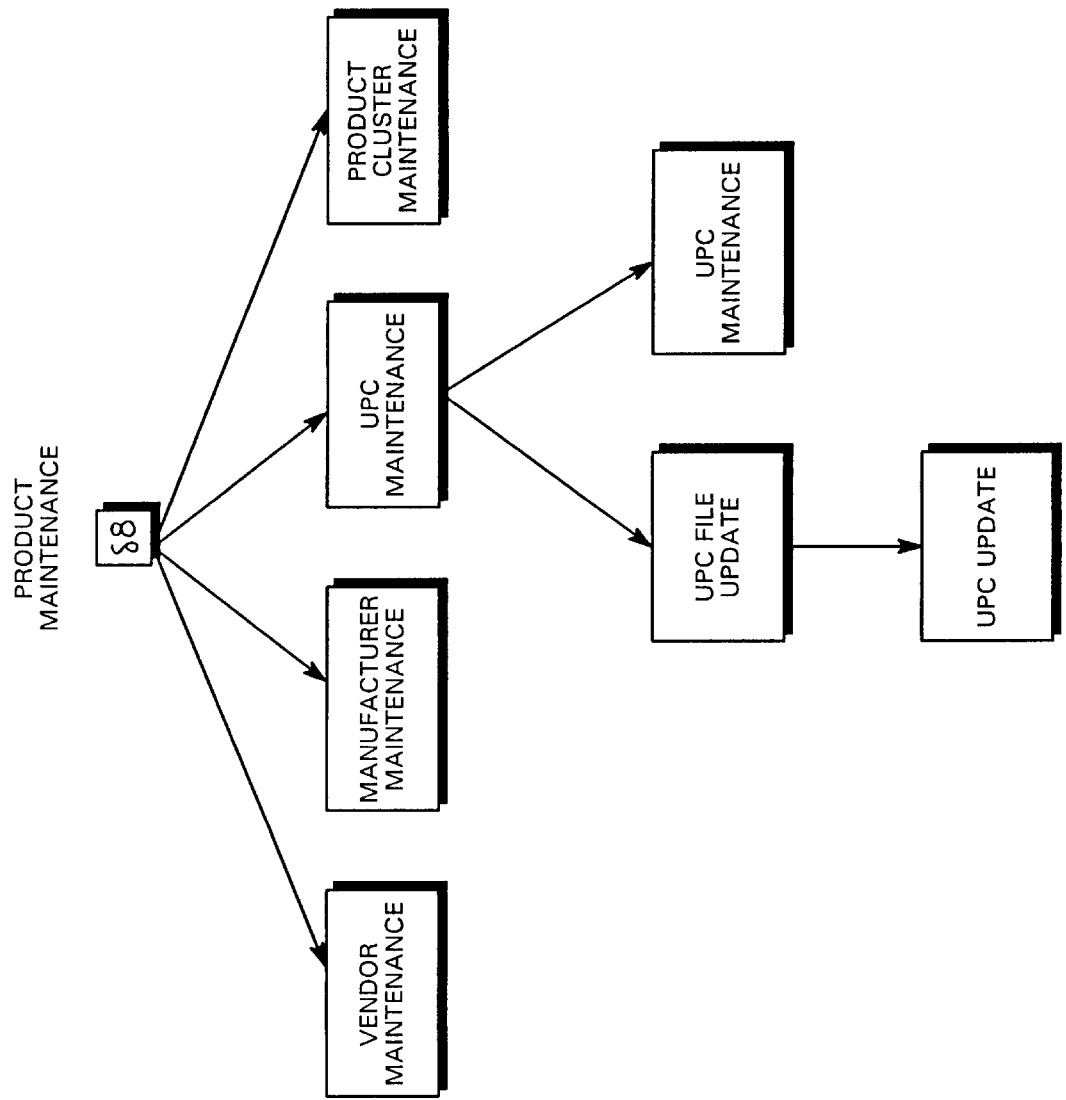

METHOD AND SYSTEM FOR GATHERING AND ANALYZING CONSUMER PURCHASING INFORMATION BASED ON PRODUCT AND CONSUMER CLUSTERING RELATIONSHIPS

This is a continuation of application Ser. No. 08/021,105, filed Feb. 23, 1993, now abandoned.

BACKGROUND AND SUMMARY OF THE INVENTION

Retail store chains, especially grocery chains, survive on high sales volumes and low profit margins. Accordingly, retail industries are constantly searching for cost effective mechanisms to reach consumers and encourage them to shop at a particular retail store. While radio and television advertising are available, and of course used, it is expensive and not particularly targeted.

Although the newspaper is the traditional and less expensive mechanism for advertising in the retail industry, newspaper advertising has many disadvantages. First, newspapers provide only limited (and expensive) space for relatively generic retail advertising, making it difficult to differentiate from other competing retail stores. Second, to reduce costs, retailers typically "shotgun" newspaper advertisements to "generic" consumers rather than direct them to any particular consumer group or need. Third, if multiple retailers use the same newspaper to advertise their goods, sensitive pricing information may potentially be leaked to competitors. For example, if one retail grocer is undercut by a single penny per pound on the price of a turkey at Thanksgiving time, that grocer could stand to lose several hundred thousand dollars in revenue.

Consequently, a less expensive, less restrictive, and more effective way for retailers to direct advertisements and other purchasing inducements to consumers must be developed. Encouraging retail store loyalty necessitates determining consumer needs which vary greatly across demographic boundaries. Therefore, there is a need to make direct marketing available to retailers.

Regional and national consumer demographics data available from Nielson and other agencies regarding consumer product movement is too general to be useful to specific retailers. Additionally, these agencies do not address product movement demographics in order to learn the particular needs and buying habits of people purchasing particular products.

Increased sales and customer loyalty may be obtained by offering a reward system. For example, the airline industry rewards loyal customers using frequent flyer programs. Attempts have been made to develop "frequent shopper" marketing and sales promotion services in retail sales. Some retail grocery chains, for example, provide coupons based upon consumer purchase amounts accumulated during a particular shopping transaction. Coupons tend to be for arbitrary goods which are not directed to any particular needs or interests of the specific consumer.

Other retailers reward frequent shoppers by distributing cards to customers who regularly purchase name brand goods manufactured by a particular vendor. Cards are used at participating retail stores to identify the customer and record purchases of particular brand goods and to award points based on the number of brand good purchases. Points are accumulated, and gifts may be selected by the card member from a catalogue.

Another card type service offered to retailers is the "Reward America Program" from Citicorp. Consumers received monthly rebates based on the number of brand name items purchased, e.g. buy three loaves of Wonderbread™ and receive $0.50; buy five loaves, receive $0.75; buy seven loaves and receive $1.00. The consumer receives quarterly rebate booklets and periodic statements showing how many items must be purchased to obtain rebates.

Unfortunately, none of these services address or meet the needs and interests of retailers. For example, many of these existing programs like the Reward America Program service develop "brand loyalty" rather than retail store loyalty. Moreover, the retailer does not own the underlying consumer purchasing data regarding frequent shopper purchases for particular brand products. As a result, the retailer lacks direct access to this information for use in advertising and promoting the retail store itself.

None of these services allow a retailer to identify particular consumer groups and particular consumer needs. For example, in the grocery retail business in the United States, double income families are pressed for time and show a trend toward less time being spent shopping and preparing meals. Retail grocers are challenged to provide incentives to encourage these kinds of shoppers into their stores. Targeted advertising would allow retailers to appeal to current public awareness of the need for natural and/or healthy foods. Identifying those shoppers having special dietary needs, e.g. medical problems and then marketing to those dietary needs may be particularly advantageous to retailers. Providing products that appeal to certain ethnic groups instead of offering generic grocery items may also be profitable.

Identification of such groups, targeting advertisements to the identified groups, and measuring the results of that advertising are primary goals of the present invention. An integrated system is required which allows individual retailers to determine buying patterns and habits of customers to determine customer needs and preferences with respect to retail products sold. Such a system must accumulate transactional data, provide meaningful analysis, and allow retailers to target specific consumers based on determined buying patterns and preferences with promotional and advertising literature tailored to preferences and needs. To achieve those goals, such a system must be capable of inputting and categorizing enormous amounts of consumer and product data, organizing that data in a logical fashion, and providing data analysis useful for marketing and advertising.

According to the present invention, the above-identified problems are overcome and the above-stated goals are achieved by providing a retailer or a retail chain with the ability to process transactional information involving large numbers of consumers and consumer products by gathering product information that uniquely identifies a specific product by type and manufacturer, grouping that product information into product clusters, and analyzing consumer retail transactions in terms of those product clusters to determine relationships between the consumers and the products. Product, consumer, and transactional data are maintained in a relational database. Targeting of specific consumers with marketing and other promotional literature is based on consumer buying habits, needs, demographics, etc. A retailer queries the relational database using selected criteria, accumulates data generated by the database in response to that query, and makes business and marketing decisions based on that accumulated data.

A method of the present invention further includes receiving consumer information describing demographic characteristics of various consumers, grouping consumers into consumer clusters based on specifically defined demographics criteria, and analyzing product transactions in terms of those consumer clusters to determine relationships between consumers and products. Using product and/or consumer clusters, a retailer determines relationships between products and consumers as well as the effectiveness of a particular product promotion.

Since the number of consumers and products far exceeds the number of consumer clusters and product clusters, the clustering technique of the present invention permits a manageable amount of data to be extracted from a much larger amount of transactional, product, and demographics data, maintained, and readily accessible in a database. Moreover, cluster parameters and definitions may be modified and redefined by the retailer without modifying underlying consumer and/or product information.

A system according to the present invention for optimizing retail marketing operations based on purchasing transactions of consumer products includes as basic components: a relational database, means for receiving consumer identifying data and product purchase transactional data, means for grouping that data into clusters of information based on predefined criteria, means for storing the cluster information in the database, and means for analyzing the stored cluster information to determine buying behaviors of retail consumers.

Point of sale terminals, such as (but not limited to) the checkout registers in a retail grocery store, record consumer purchase transactions typically by means of scanning the bar code label attached to the product. Although optical means for detecting this coded information is preferred, other mechanisms for reading this data could also be used, e.g. magnetic strip reading, etc. Recorded consumer purchase transaction information is communicated from the point of sale terminals to the receiving means.

A supervisory retail processor performs in an alternative aspect of the present invention an intermediary function between the point of sale terminals and the relational database system. The supervisory retail processor stores a master product list containing all valid product numbers, e.g. bar codes, for every product carried by the retail store. The transactional information received from the point of sale terminals is checked against the product list to ensure that the registered product numbers are valid. The supervisory retail processor then transmits the master product list and the transaction log to the system receiving means or repositioning.

A user interface at the retail store or at the supervisory retail processor allows a retailer to input specific queries to the system to retrieve particular types of information from the relational database. For example, these queries may relate to determining purchasing behaviors of retail consumers, determining the effectiveness of promotional efforts with respect to particular products, and ascertaining particular characteristics (demographics and otherwise) of consumers purchasing particular products.

Clustering is employed in a system of the present invention to associate consumer identifying data into a plurality of consumer clusters based on predefined consumer criteria. Similarly, products from the product list are assigned to product clusters based on predefined product criteria. A retailer may modify the predefined consumer and product criteria to dynamically alter the consumer and product clusters. Thus, huge amounts of data are stored, managed, accessed, and analyzed in an effective and practical way using clusters.

The system according to the present invention further includes a mechanism for gathering consumer identifying data and encoding that data into digital format. The encoded consumer data is transmitted directly to (or via the supervisory computer) the system receiving means. Consumer identifying data includes such things as consumer demographics, income ranges, product preferences and other characteristics. Once consumer identifying data are received, membership cards are issued to consumers with coded identifiers uniquely identifying a consumer. Point of sale terminals at retail stores detect consumer coded identifiers by scanning membership cards and associate identifiers with products purchased by a consumer at that point of sale terminal.

The present invention includes a printing subsystem connected to the analyzing means for printing promotional literature directed to particular consumers based on cluster information stored in the relational database. In one embodiment, the printing subsystem generates and directs relevant promotional literature to certain consumers using names and address lists from the relational database. Promotional literature may include, for example, advertisements, newsletters, and coupons. With the printing subsystem of the present invention, customized promotional information most relevant and most likely to be of interest to a particular consumer based on their buying behaviors and their demographics is included in targeted promotional literature mailed to that consumer.

Thus, it is a primary object among many other objects of the present invention to provide efficient creation and management of a relational database system readily accessible by retailers to effectively target specific consumers and consumer groups with relevant advertisement, promotional, and informational direct mailed media. These and other features and advantages of the invention will become clear from an inspection of the detailed description of the invention, read in conjunction with the drawings, and from the appended claims.

BRIEF DESCRIPTION OF THE DRAWINGS

FIG. 4 is a flow chart of exemplary procedures performed by the consumer application subsystem in the present invention;

FIG. 6 illustrates the clustering concept according to the present invention;

FIGS. 12(a)–12(i) are data models showing data structures provided in the repository administration subsystem of the present invention.

DETAILED DESCRIPTION OF THE INVENTION

In the following description, for purposes of explanation and not limitation, an exemplary embodiment including specific components, interfaces, and techniques is provided in order to provide a thorough understanding of the present invention. However, it will be apparent to those skilled in the art that the present invention may be practiced in other embodiments and may depart from specific details. In other instances, detailed descriptions of well known devices, circuits, and programming procedures are omitted so as not to obscure the description of the present invention with unnecessary detail.

The method and system according to the present invention provide a retail business entity whether an individual retail store or a retail chain of stores (hereafter "retailer") with the ability to determine and analyze buying behaviors with retailer consumer customers (hereafter simply "consumers"). By categorizing consumer retail products (hereafter "products") into product groupings referred to as product clusters and/or consumers by specific characteristics and demographics into consumer clusters, consumer buying behaviors may be identified, tracked, and employed by retailers in direct, consumer marketing as described in more detail below. For purposes of simplicity in describing exemplary embodiments, the present invention is referred to as the "frequent shopper system."

While exemplary embodiments of the present invention are described in terms of retail grocer stores and chains, it will be understood by those skilled in the art that the present invention may be applied to any retail store or retail chain of operations including, for example, department store chains, toy store chains, and other retail industries such as financial and insurance retail industries.

Figure 1:
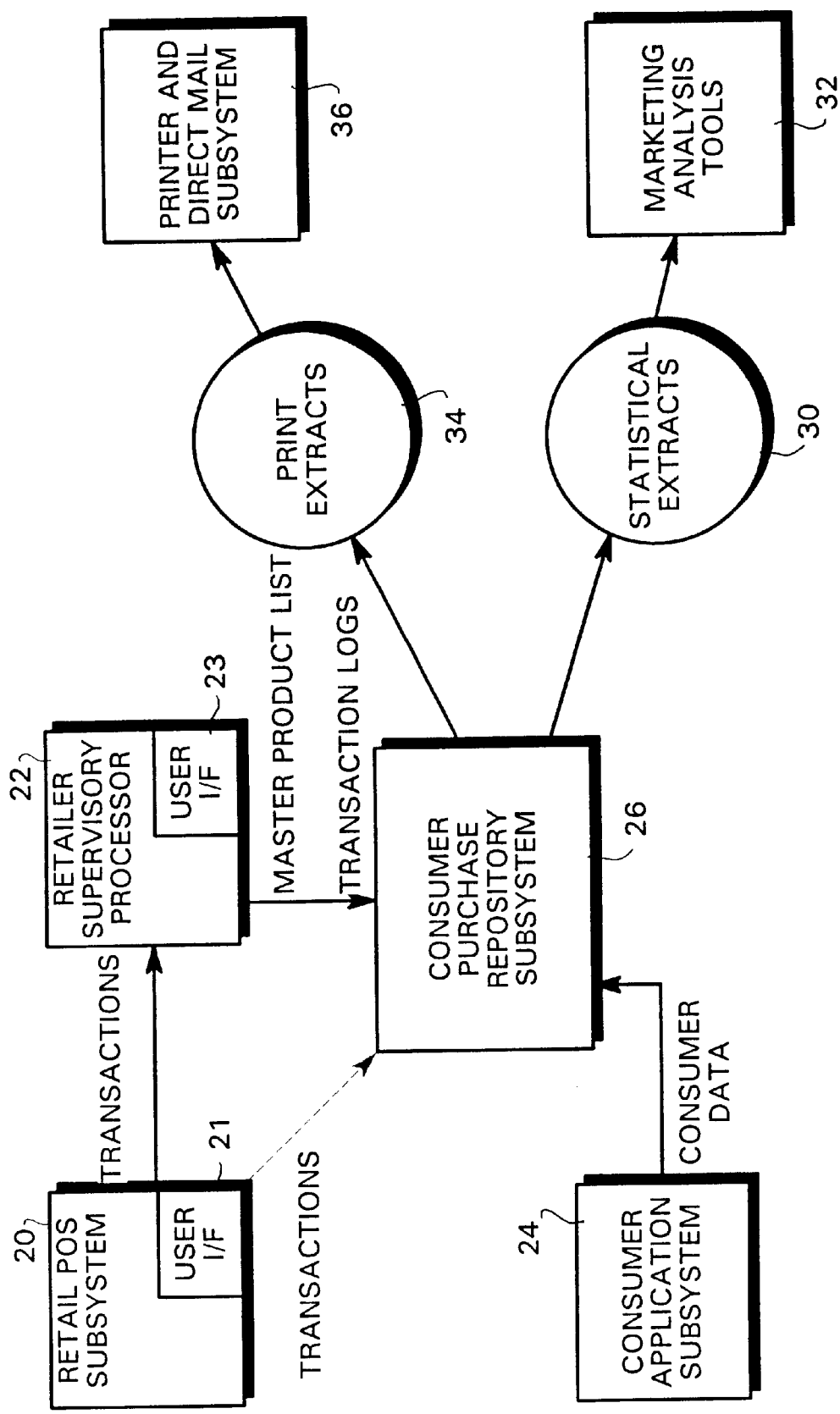
FIG. 1 is a schematic block diagram including a high level functional overview of an exemplary system for implementing the present invention.

The frequent shopper system is illustrated generally in FIG. 1 and includes retail point of sale (POS) subsystem 20 and user interface 21, retailer supervisory processor 22 and user interface 23, consumer application subsystem 24, consumer purchase repository subsystem 26 (a relational database), marketing analysis tools 32, and printer and direct mailing subsystems 36. Retail point of sale subsystem 20, consumer application system 24, and consumer purchase repository 26 capture, warehouse, maintain and allow queried access of consumer characteristics and buying behaviors. Marketing analysis tools 32 such as conventional statistical analysis software packages, e.g. SPSS, Cognos Impromptu™, Cognos Power Play™, etc., and print and direct mailing subsystem 36 are used to create value-added information targeted to particular consumers and a medium (e.g. advertisements, newsletters, coupons, etc.) for communicating that information with a consumer.

Consumer application subsystem 24 provides a mechanism by which consumers provide various demographic and other characteristic information as consumer data to consumer purchase repository 26. Product transactions that occur at the retail point of sale system 20 may be forwarded to the retailer supervisory processor 22. Daily product transaction log files, a master product item list, and consumer data from consumer application subsystem 24 are forwarded to the consumer purchase repository 26. The daily product transaction log files may be forwarded via retailer supervisory processor 22 or directly from the retail POS subsystem 20. Data is categorized and stored in clusters (product and/or consumer). Various buying behaviors and patterns may be extracted from the cluster data stored in consumer purchase repository 26 in the form of statistical extracts 30 and used by retailers along with conventional software market analysis tools 33 to determine statistical patterns, e.g. buying habits based on specific consumer demographics, for formulating retail marketing strategies. Consumer and product information retrieved from consumer purchase repository 26 in the form of print system extracts 34 is forwarded to the printer and direct marketing subsystem 36.

Figure 2:
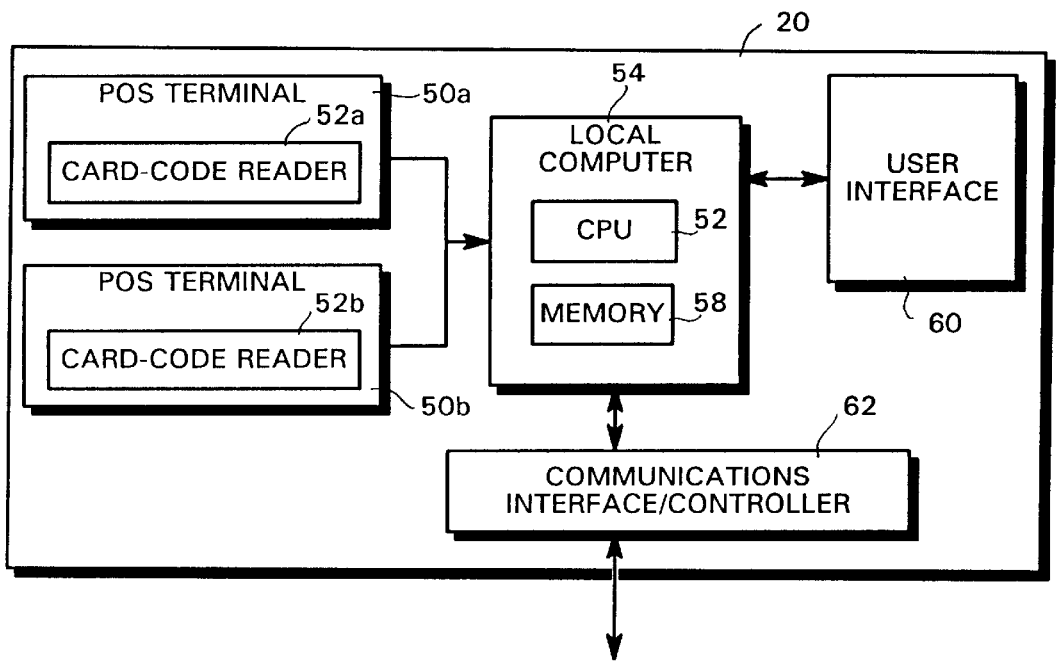
FIG. 2 is an exemplary block diagram of the retail point of sale subsystem shown in FIG. 1.

Retail point of sale subsystem 20, illustrated in more detail in FIG. 2, includes a plurality of conventional point of sale terminals 50A, 50B, etc. Retail point of sale systems with bar code scanning capabilities are available from such manufacturers as IBM Corporation, NCR, etc. However, in the preferred embodiment of the present invention, "smart cards" are provided for consumers who purchase goods from the retail store or chain.

The term smart card refers to a variety of wallet-sized cards having a programmable memory for storing larger amounts of data in a more secure format than, for example, a magnetic strip card. While a smart card's appearance may contain traditional characteristics of a credit card, e.g. it may have a magnetic strip, it includes a memory on an additional surface which permits a read/write device to read data from and write data to card memory. The following memory types are available: serial memory which has limited storage capacity, an integrated chip (IC) having larger amounts of memory and an on-chip microprocessor, and optical memory using write once, read many (WORM) technology for storing still larger amounts of data.

Preferably, the IC chip smart card may be employed in the frequent shopper system because the dynamic memory permits data to be updated, e.g. product transactions at particular stores, and provides enhanced security, e.g. multiple passwords for different stored information. Communication between the smart card and a POS terminal can be via direct contact with an optical or magnetic reading device or via RF communication link. Other benefits of the IC smart card are (1) credit can be issued from the POS terminal 50a onto the smart card and (2) the database at the consumer repository 26 can be updated as needed. Moreover, if a retailer does not have on-line access to the frequent shopper database, recent transactional information recorded on the consumer's smart card may be credited for a current transaction.

Each point of sale terminal includes a card-code reader 52A, 52B, etc. for scanning/reading codes assigned to various products purchased by a consumer during a purchasing transaction as well as identification and other information from consumer membership cards, i.e. smart cards. Card-code readers 50A and 50B may be optically based, but the present invention envisions other kinds of reading mechanism as well, e.g. a magnetic strip detector for reading coded information on a magnetic strip, etc.

All products sold by a retailer are conventionally assigned a universal product code (UPC) for example in the United States or a European article number (EAN) in Europe to uniquely identify each product sold by a retailer. UPC and consumer identifying data are received in a local computer 54 which includes the typical CPU 56, memory 58, and user interface 60. Point of sale product information and consumer identification information associated with each point of sale transaction are communicated via conventional communications interface/controller 62 via retailer supervisory processor 22 or directly to the consumer-product purchase repository 26. Conventional communication interface/controllers, e.g. ETHERLINKII™, may be obtained, for example, from 3COM. The communications interface controller 62 for conducting communications over a network may be accomplished by conventional modem-type communications over the telephone network or by a hardwire cable network using Ethernet™ and related software.

Local computer 54 maintains a product item list and daily transaction log file for detecting the UPC of each product purchased by a particular consumer during a transaction to (1) ensure that the UPC corresponds to a valid code stored on a master list, (2) manage conventional inventory functions, and (3) regulate communications of daily transactions between point of sale subsystem 20 and retailer supervisory processor 22 or consumer product purchase repository 26. Computer software required to run inventory product code comparisons and transaction log compilation in local computer 54 or supervisory processor 22 is conventional and available from vendors who supply POS systems.

Figure 3:
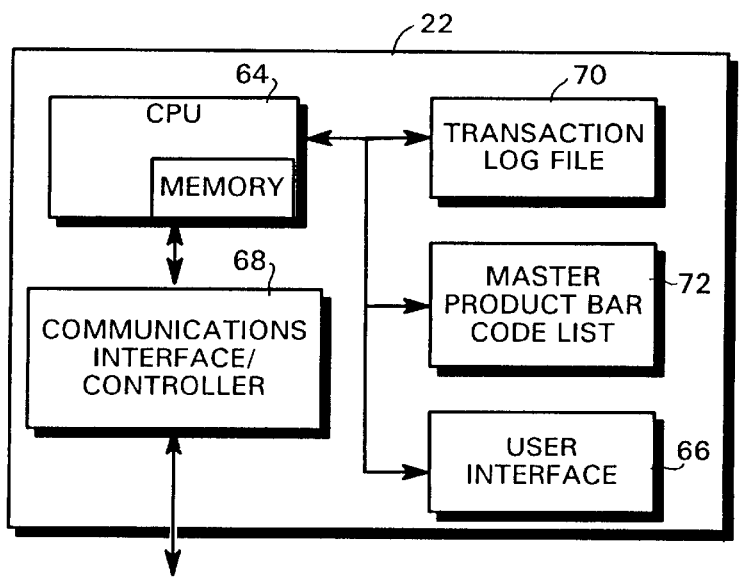
FIG. 3 is an exemplary block diagram of the supervisory processor shown in FIG. 1.

As shown in further detail in FIG. 3, retailer supervisory processor 22 includes conventional CPU and memory 64, user interface 66, communications interface controller 68, and two external memories: transaction log file 70 and master product bar code file 72. Retailer supervisory processor 22 generally receives transactional information from a number of retail point of sale subsystems 20 from plural stores in a retail chain. A master product code list 72 includes valid UPC codes for products sold in all retail stores in the chain. Transaction log file 70 accumulates transactions, typically on a daily basis, for products purchased by consumers at all retail stores. CPU 64 performs retail inventory functions, product code validity testing, and forwarding of transaction log information to the consumer product purchase repository 26 via communications interface/controller 68.

User interfaces 60 and 66 may be used to perform a number of functions relating to inventory control, etc. In addition, various queries and requests of the consumer product purchase repository 26 are formatted and transmitted by a retailer via user interfaces 60 and 66.

FIG. 4 outlines procedures followed in the consumer applications subsystem 24. Frequent shopper membership applications are completed by consumers at each retail store and collected (block 74). Each consumer who fills out a membership application is assigned a membership identification number (MIN) (block 76). A membership card, e.g. a smart card, is manufactured and issued to a consumer with a corresponding MIN. Optionally, some demographic information obtained from the membership application and specific to that consumer may also be stored on the card. Consumer application information is input and formatted into an appropriate digital form (block 80), and forwarded along with corresponding MINs to the consumer-product purchase repository 26 (block 82).

Typical consumer information includes household demographics where the term demographics refers to names, address (including zip code), ages of members in the household as well as dietary restrictions, number and type of household appliances, income, pet information, and any other characteristic features that may identify particular consumers and particular consumer preferences/needs.

Figure 5:
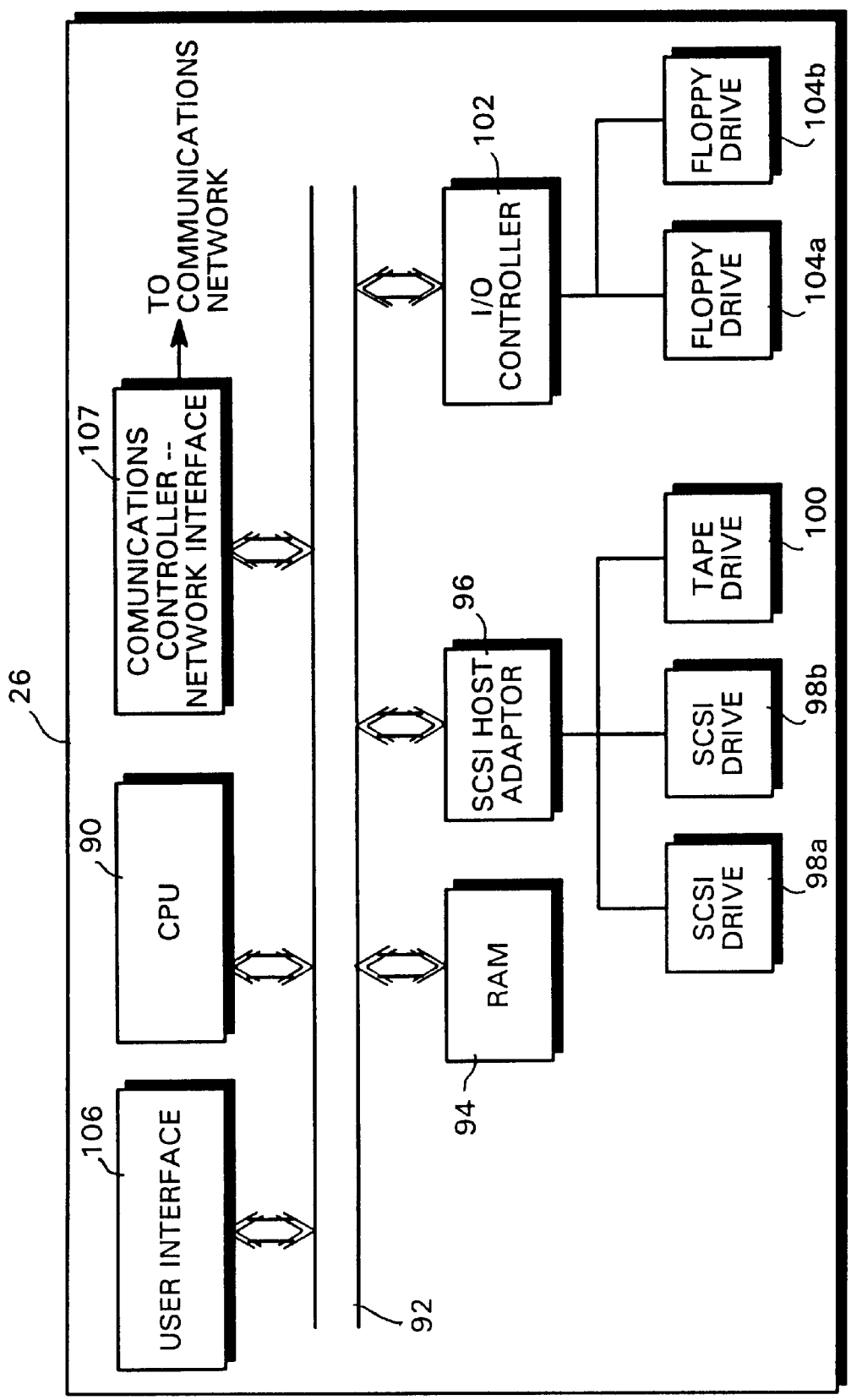
FIG. 5 is an exemplary functional block diagram of the Consumer Purchase Repository subsystem shown in FIG. 1.

Consumer data and transactional product logs are forwarded to consumer purchase repository subsystem 26 which is essentially a relational database management system (RDBMS). FIG. 5 provides additional details of exemplary hardware components which may be used to implement consumer product repository 26. CPU 90 is preferably a 32-bit microprocessor such as the 80486 or 80586 manufactured by Intel. The CPU clock speed is preferably at least 33 MHz. CPU 90 is the "engine" which drives and manages a relational database such as that available from ORACLE, via a standard address, data, and control buses 92, including conventional semiconductor and magnetic storage. Random access memory (RAM) 94 receives programs to be executed by CPU 90 and data to be used in program execution. The bulk of the consumer and product information is stored on magnetic storage which include conventional SCSI drives 98A, 98B and tape drive 100. Data are accessed from these drives via a SCSI host adapter 96 which allows the SCSI and tape drive (mass storage media) to be daisy-chain connected to data bus 92. Additional storage is provided via floppy disk drives 104A and 104B which interfaces to data bus 92 by way of a conventional I/O controller 102. These types of storage devices as well as their interface/adapters are conventional and therefore require no additional description.

User interface 106 which includes conventional keyboard, mouse, and display terminal allows a user to store, query, and access information from the relational database. Conventional communications controller/network interface 107 provides the necessary hardware and software links to communicate with other subsystems of the present invention, e.g. consumer application system 24, supervisory processor 22, etc. The network may include the public telephone network accessed by conventional modem or a dedicated ETHERNET™ cable link. The operating systems software of CPU 90, such as the UNIX™ operating system (OS) incorporates the necessary protocol required for communications over ETHERNET™, e.g. TCP/IP software. Preferably, an ETHERNET™ communications network is used because of greater communications speed and flexibility.

In operation, consumer data are transmitted either by network or via a flat data file from consumer applications system 24 in an appropriate format, e.g. ASCII for storage in the relational database. Similarly, product item list and transaction log file information from the retailer supervisory processor 22 (or from retail point of sale system 20) are received in appropriate data format. CPU 90 stores this data in mass media storage devices 98A, 98B, 100, 104A, and 104B. Before storage, however, and as will be described in further detail below, received data are first organized and substantially reduced using a clustering analysis.

Building database 26, clustering of product and or consumer data, storing data in database 26, updating the database 26, formulating and executing database queries, and performing other analysis of the database 26 are accomplished using conventional database software packages, such as ORACLE™ software. This ORACLE™ software allows a user to both access and view specific data from the database as well as combine specific data in a particular fashion. The ORACLE™ software's primary functions are relational database management. The relational management database system is the database kernel software that manages the structure of the database and handles database requests and data coming into and going out of the database structure. Structured query programming language (SQL) is used to create, alter and delete database objects (and specific data) from the database structure. SQL software is not particular to ORACLE™ products and is available from other software vendors.

A variety of database development tools well known to those skilled in the art, such as SQL*PLUS™, SQR™ available from SQL Solutions Inc., SQL*Forms™, SQL*MENU™ and PRO*C™ which are available from ORACLE™, may be used by the database programmer to perform various functions and provide various capabilities to the end user (retailer). For example, the SQL* forms and SQL*MENU tools may be used in the present invention to develop a user-friendly interface to the frequent shopper data base. The user-friendly interface allows unfamiliar users to construct requests and queries of the database without having particular expertise with ORACLE™ or SQL software. SQL*PLUS is an interactive SQL command interface that permits a user to query the database as well as add and edit database objects. With this particular tool, a programmer creates one or more "scripts" which are essentially very high level language programs for further simplifying use of the database by an end user like the retailer. PRO*C is another useful tool which precompiles code written in the programming language C which includes SQL statements embedded in the C code to generate executable code. SQR™ is a procedural reporting tool that has useful query and formatting capabilities.

Specifically, data files of consumer information from consumer applications subsystem 24 or product transactional information from retail POS 20 or retail supervisory processor 22 are read into RAM 94 via communications interface 107. CPU 90 validates and summarizes product transactional information. For each transaction, CPU 90 validates UPC product codes and associated consumer MINs; identifies a product cluster to which particular products in the transaction belong; and identifies a particular consumer cluster to which a consumer identified by MIN belongs. For example, if a consumer purchased a particular brand of soda, that item could be assigned to a cluster defined by the retailer generically as beverages. In the same fashion, a particular brand of cat food would be included in another generic cluster entitled pet foods. After categorizing each product transaction into a product cluster and validating its UPC code, CPU 90 "posts" that cluster information to the relational database.

Posted information for each consumer or product cluster is divided logically into essentially three tables. A first table includes consumer cluster information for each card member. For example, a database table is generated listing in separate columns: consumer MIN, purchase dates, dollar amounts per purchase, discount amount, etc. A second table includes total dollar amounts for a particular card member for each year. A third table is a consumer history including entries such as the time spent by a particular consumer in each store, the money spent per store visit, any discounts acquired per store visit, etc. In this way, the database stores for each customer MIN transaction purchase dates, amounts, and discounts for various product clusters rather than specific products.

A retailer querying the database may want to determine which customers spend the most money (1) overall, (2) per particular cluster or (3) particular time of year. For example, the following query written in the SQL programming language might be used to access the card numbers of consumers who spend $50 or more on the average visit to the retail store.

SELECT CARD_NUMBER FROM HOUSEHOLD_PURCHASE_TOTALS WHERE (TOTAL_PURCHASE_AMOUNT/TOTAL_VISIT_NUMBER)>=50:

More complex queries can be performed to join the accessed card numbers with the demographics of the consumer's household. Queries may also be made without knowledge of SQL commands by the retailer through the use of predefined scripts employed through menu options. The information resulting from the query can be used, for example, to target those customers with promotional and advertising material directed to products within that cluster.

Similar posting of consumer data from consumer applications may be divided into appropriate tables based on demographic, dietary, appliance, cultural, and other consumer characteristics. By categorizing consumers by characteristics into groups, clusters of "similar" consumers are identified and associated with particular product clusters in response to retailer queries.

Queried information from the frequent shopper database may be communicated to the printer and direct mail subsystem 36 via modem, direct cabling link, or by manually transferring the queried information in a flat file. As a simple example, the queried information can simply be a mailing list retrieved from the frequent shopper database which lists all the people and their addresses who shopped at a particular retail store in the past six months. The printer subsystem 36 would receive this list so that the names and addresses of those consumers could be printed and attached to promotional literature (also printed at the print facility) for direct mailing to those consumers.

At a more comprehensive level, a retailer may desire to promote by coupons, for example, a particular product, e.g. microwave dinners. The frequent shopper database could then be queried by the retailer to extract a report, for example, of all consumers in the database who own a microwave oven. The names and addresses of those consumers would then be used by the printer and direct mail subsystem 36 to print up mailing labels as well as coupons for the microwave oven dinners and mail that information to the targeted consumers.

The printer and direct mail subsystem 36 is not limited, however, to printing and mailing coupons or advertisements. It may also be used, based on queries extracted from the frequent shopper data base (and optionally on knowledge-based print rules), to print customized promotional information such as newsletters. These newsletters would be of interest to particular consumers targeted based on their statistically determined buying behaviors and their demographics in an effort to interest those consumers in particular retail products.

The clustering technique according to the present invention is illustrated conceptually in FIG. 6. For example, product clusters could allow a retail grocer to categorize 40,000 to over 60,000 products into any smaller number of product clusters, e.g. 15 to over 100 product clusters. In the same way, a 100,000 to over a 1,000,000 consumers could be summarized into anywhere from 6 to over 100 consumer clusters.

The procedure by which product clusters may be defined follows. The UPC product list is loaded into the relational database by batch entry or by interactive entry (i.e. one at a time by a data entry person). Batch entry may be accomplished by processing a data file in ASCII format that contains the complete list of UPC and product descriptions. For example, the ASCII file might include the following type of data:

10086302145, Heintz™ Ketchup 8 oz., 2.35;
00002541900, Purina Puppy Chow™ 20 lbs., 8.95;

The product clusters defined and entered interactively into the database via user interface provide cluster identification, cluster description, etc. Thereafter, UPC's are associated with a cluster identification code through the user interface screen to link a product to one or more cluster identification codes. An example of that association might be as follows:

| UPC PRODUCTS | UPC CLUSTER ASSOCIATION | PRODUCT CLUSTERS |
| --- | --- | --- |
| 10086302145 Heintz Ketchup 8 oz. | 10086302145 01 | 01 General |

Consumer clusters are defined as follows. Consumer group criteria are established when a query or report is to be executed. Consequently, consumer clusters are not hard coded and can be established and modified as needed. For example, a report can be run specifying the following criteria which define the consumer cluster.

income: $0–25,000 household size: 1–3 people

Head of household between 20–35 yrs. old

The households that meet this criteria will be selected at execution time based on the demographic information contained in the database. Database queries can be run in the same manner, specifying the criteria that defines a particular consumer cluster.

Figure 7:
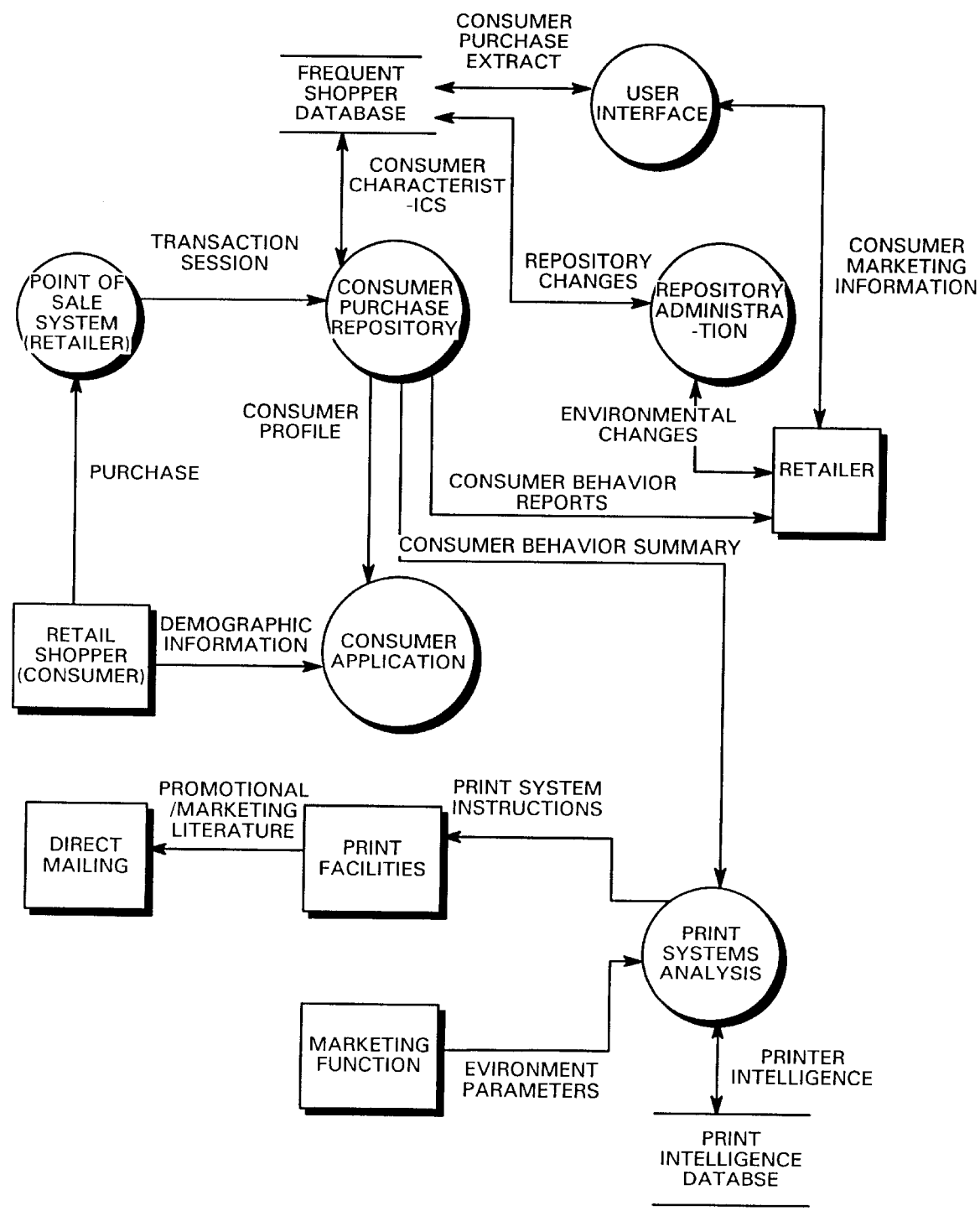
FIG. 7 is a process flow diagram of exemplary program control processes performed in the present invention.

Exemplary software programs and data structures required for each of the subsystems of the present invention will now be described in terms of various process data flow diagrams and data models. An overall process data flow diagram for the frequent shopper system according to the present invention is illustrated in FIG. 7. Those of ordinary skill in the art will appreciate that based on the data process flows and data models provided below, queries, data structures, programs, etc. for implementing the present invention may be readily generated. Any suitable language and specific coding for implementing the process flows and data models may be used.

With respect to FIG. 7, data flow relationships are indicated and labelled by arrows between the various subsystems of the present invention and entities. These relationships define what and how information will be stored in the database. The symbols and flow connections used in FIG. 7 are described in the table set forth below.

| Identifier | Type | Definition |
| --- | --- | --- |
| POINT OF SALES SYSTEM | Data Process | Point of sale system functioning within the actual retail outlet environment. Includes scanners, registers, and in-store concentrators. |
| RETAIL SHOPPER | External Entity | The consumer of the retailer. Each consumer is also associated into a household which is tracked as a single entity. |
| CONSUMER APPLICATION | Data Process | Subsystem providing a means for capturing information about a store consumer. Consumer characteristic and demographic information entered on an application form and subsequently entered into a data file. |

-continued

| Identifier | Type | Definition |
|---|---|---|
| PRINT FACILITIES | External Entity | Site of actual print production and manufacturing that is computer interfaced with a data-system generated by the database in response to a query. |
| MARKETING FUNCTION | External Entity | Functional group responsible for the definition of direct marketing programs and products and for the direct support of retailers. |
| DIRECT MAILING | External Entity | Facility that receives printed promotional and advertising materials and distributes those materials to targeted consumers. |
| FSDB | Data Store | Main repository for consumer characteristics and transactional purchase history. |
| CONSUMER PURCHASE REPOSITORY | Data Process | Main repository of consumer information and purchase history. Contains product cluster definition, organizational structure, and other definitional information. |
| PRINT SYSTEMS ANALYSIS | Data Process | Set of functions driving the format and setup of the final printed product. Analyzes consumer data against defined print product formats to determine resultant printing instructions. |
| PRINT INTELLIGENCE DATABASE | Data Store | Respository of information describing and defining the relationship between consumer behavior and the format of the printed product. |
| USER INTERFACE | Data Process | Set of reports, queries, and extracts providing value-added analysis and formatting of information contained in the consumer purchase repository. May function on a both scheduled and as needed basis. |
| REPOSITORY ADMINISTRATION | Data Process | Facility for the administration of the consumer purchase respository. Provides access to the organizational and structural information in the repository such as product clusters. |
| RETAILER | External Entity | Retailer business entity. |

FLOW CONNECTIONS:

| Identifier | Type | Definition |
|---|---|---|
| PURCHASE | Data Flow | The actual transaction between a retail grocer and one of their consumers. |
| DEMOGRAPHIC INFORMATION | Data Flow | Information provided by the retail grocer's consumer on the sign-up application. Includes demographic and psychographic data such as age, number of people in family, income, specific consumer products used in household, etc. |
| TRANSACTION SESSION | Data Flow | A set of transactions representing the total "check-out" interaction between the retail grocer and one of their consumers at one time. Includes purchases, voids, and all other activity conducted at the POS workstation. |
| REPOSITORY CHANGES | Data Flow | Updates made by database information administrator to the database via the retailer interface. |
| CONSUMER PROFILE | Data Flow | The interface to the database containing the consumer demographic and psychographic information aggregated by the consumer application subsystem. |
| CONSUMER BEHAVIOR SUMMARY | Data Flow | Summarization of consumer household buying behavior. |
| PRINT SYSTEM INSTRUCTIONS | Data Flow | A set of parameters defining the actions and decisions to be taken by the Print Systems Analysis Subsystem. |
| CONSUMER PURCHASE EXTRACT | Data Flow | Summarization of consumer household buying behavior based on predefined sets of extract criteria such as consumer cluster definitions. |
| CONSUMER MARKETING INFORMATION | Data Flow | A set of value added, summarized reports and/or graphs depicting consumer buying behavior for a specified set of criteria. |
| PRINTER INTELLIGENCE | Data Flow | Detailed instructions defining the format of a mailing piece for a specific consumer. |
| ENVIRONMENTAL CHANGES | Data Flow | Specific changes and new information to be applied to the database via User Interface. |
| CONSUMER CHARACTERISTICS | Data Flow | The actual components of consumer demographic and psychographic information added to the database. |
| ENVIRONMENT PARAMETERS | Data Flow | Set of instructions and parameters defining the printing environment relating format to print content for consumer clusters. |
| CONSUMER BEHAVIOR REPORTS | Data Flow | Set of standard reports showing consumer buying behavior across time intervals, store sites, product clusters, departments, and within consumer clusters. |

Figure 8:
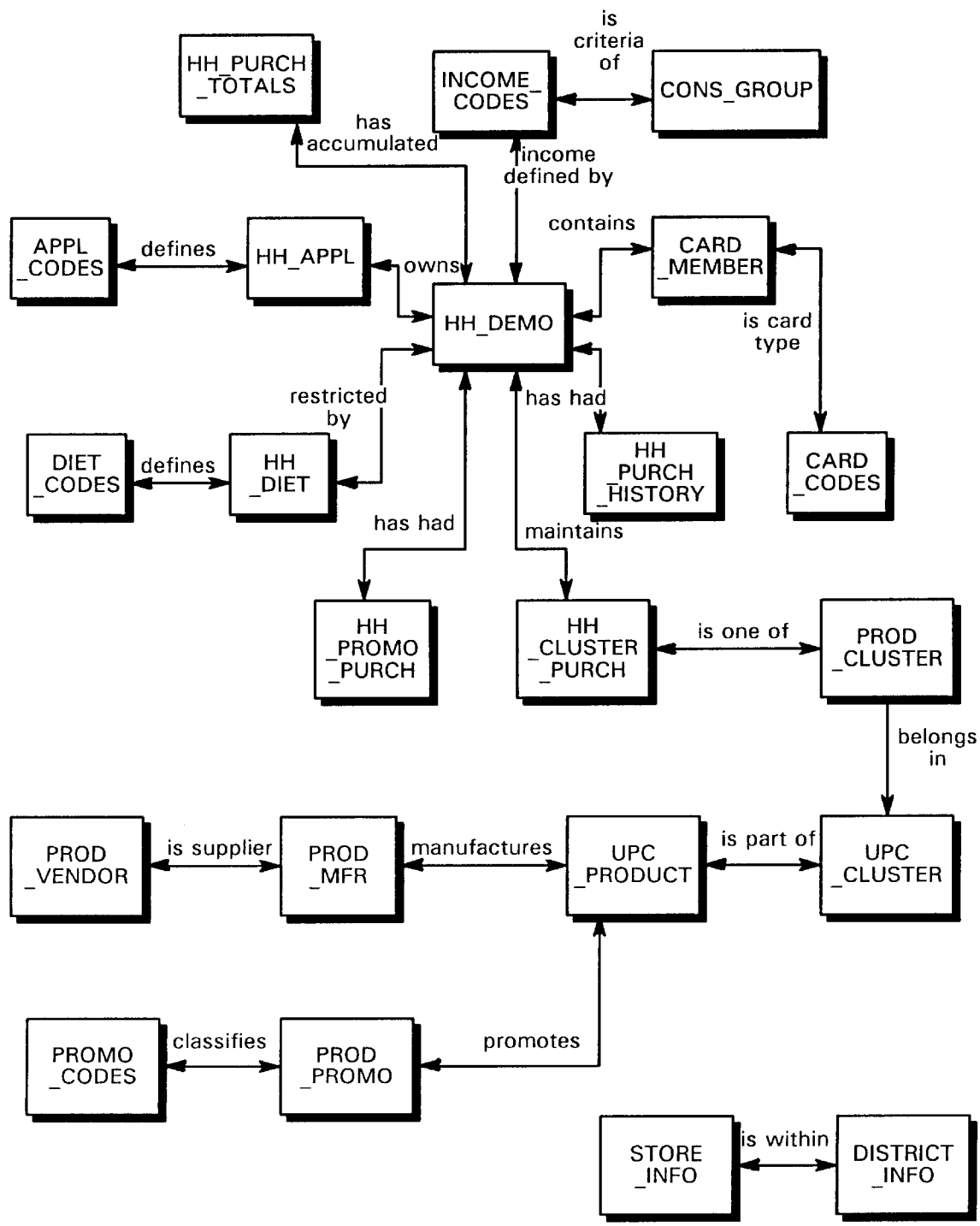
FIG. 8 is a data model diagram for data structures provided in the relational database of the Consumer Purchase Repository subsystem according to the present invention.

FIG. 8 is a data model showing the manner in which data in the frequent shopper database are associated and interrelated. Each of the codes used in FIG. 8 are defined in the following table:

| Identifier | Definition | Description |
| --- | --- | --- |
| APPL_CODES | APPLICATION CODES | Coded list of potential appliances a consumer household may own. |
| DIET_CODES | DIETARY CODES | A coded list of potential dietary requirements for a consumer household. |
| PROD_VENDOR | PRODUCT VENDOR | The supplier of a product; not necessarily the manufacturer. Includes name and address. |
| PROMO_CODES | PROMOTION CODES | A coded user classification of promotions with description. |
| HH_APPL | HOUSEHOLD APPLIANCES | A list of codes indicating the appliances a consumer household claims to own. |
| HH_DIET | HOUSEHOLD DIETARY REQUIREMENTS | A list of codes indicating the dietary preferences of the consumer household. |
| PROD_MFR | PRODUCT MANUFACTURER | Name and address of a product's manufacturer. |
| PROD_PROMO | PRODUCT PROMOTION | A definition of a product promotion, including the start and end dates of the promotion ("flight time"). Also establishes a tracking period to allow for before, during and after sales figures. |
| HH_PURCH-TOTALS | HOUSEHOLD PURCHASE TOTALS | A cumulative total of a consumer household's purchases. |
| HH_PROMO_PURCH | HOUSEHOLD PROMOTION PURCHASES | The cumulative amount of a consumer household's purchase on a specific promotion item. |
| HH_DEMO | HOUSEHOLD DEMOGRAPHICS | Names, addresses, ages, and other demographic features that help uniquely identify the consumer household. |
| INCOME_CODES | INCOME CODES | A codes list of consumer household income ranges. |
| HH_CLUSTER_PURCH | HOUSEHOLD CLUSTER PURCHASES | A cumulative total of a specific product cluster associated with the consumer household. |
| UPC_PRODUCT | UPC PRODUCT | A descriptive definition of a specific product. |
| STORE_INFO | STORE INFORMATION | Information about a specific store in the retail chain. |
| CARD_MEMBER | CARD MEMBER | Descriptive characteristics of an individual card member within a consumer household. |
| HH_PURCH_HISTORY | HOUSEHOLD PURCHASE HISTORY | A trail of data and total amount of a consumer household's purchases. |
| CONS_GROUP | CONSUMER GROUP | A specific consumer cluster defined by a set of demographic and/or buyer behavior criteria. |
| PROD_CLUSTER | PRODUCT CLUSTER | A list of predefined product clusters and their descriptions. |

-continued

| Identifier | Definition | Description |
|---|---|---|
| UPC_CLUSTER | UPC CLUSTER | A member of a product cluster connecting a product to a product cluster. |
| CARD_CODES | CARD CODES | Coded categories of the type of cards issued to consumers such as "check-cashing", etc. |
| DISTRICT_INFO | DISTRICT INFORMATION | A definition of an operational district within a retail chain. |

Each particular object indentifier is structured as a table with a number of component names being included in each table. A list of potential components in each object indentifier table is included below.

| Object Identifier | Component Names |
|---|---|
| APPL_CODES | = APPL_CODE |
|  | +APPL_DESC |
| CARD_CODES | = CARD_CODE |
|  | +CARD_DESC |
|  | +CREATE_DATE |
|  | +CREATE_USER |
| CARD_MEMBER | = CARD_NUM |
|  | +CARD_SEQ_NUM |
|  | +APPLIC_DATE |
|  | +ISSUE_DATE |
|  | +LAST_NAME |
|  | +FIRST_NAME |
|  | +MID_INITIAL |
|  | +BIRTH_DATE |
|  | +SOC_SEC_NUM |
|  | +DRV_LIC_NUM |
|  | +DRV_LIC_STATE |
|  | +EMPL_NAME |
|  | +EMPL_ADDR1 |
|  | +EMPL_ADDR2 |
|  | +EMPL_CITY |
|  | +EMPL_STATE |
|  | +EMPL_ZIP |
|  | +EMPL_PHONE |
|  | +BANK_NAME |
|  | +CHK_ACCT_NUM |
|  | +CARD_CODE |
|  | +STORE_ID |
|  | +DISTRICT_ID |
| CONS_GROUP | = GROUP_ID |
|  | +BEG_AGE_DATE |
|  | +END_AGE_DATE |
|  | +BEG_AGE_NUM |
|  | +END_AGE_NUM |
|  | +BEG_HH_NUM |
|  | +END_HH_NUM |
|  | +INCOME_CODE |
|  | +CREATE_DATE |
|  | +CREATE_USER |
| DIET_CODES | = DIET_CODE |
|  | +DIET_DESC |
|  | +CREATE_DATE |
|  | +CREATE_USER |
| DISTRICT_INFO | = DISTRICT_ID |
|  | +DISTRICT_DESC |
|  | +CREATE_DATE |
|  | +CREATE_USER |
| HH_APPL | = CARD_NUM |
|  | +APPL_CODE |
| HH_CLUSTER_PURCH | = CARD_NUM |
|  | +CLUSTER_ID |
|  | +TOT_CLUS_QTY |
|  | +TOT_DIS_AMT |
|  | +TOT_PURCH_AMT |

-continued

| Object Identifier | Component Names |
|---|---|
|  | +PURCH_DATE1 |
|  | +PURCH_DATE2 |
|  | +PURCH_DATE3 |
|  | +PURCH_DATE4 |
|  | +PURCH_DATE5 |
|  | +STORE_ID |
|  | +DISTRICT_ID |
| HH_DEMO | = CARD_NUM |
|  | +LAST_NAME |
|  | +HH_ADDR1 |
|  | +HH_ADDR2 |
|  | +HH_CITY |
|  | +HH_STATE |
|  | +HH_ZIP |
|  | +HH_PHONE |
|  | +MAIL_IND |
|  | +HH_NUM |
|  | +CHILD_NUM |
|  | +CHILD1_BDATE |
|  | +CHILD2_BDATE |
|  | +CHILD3_BDATE |
|  | +CHILD4_BDATE |
|  | +CHILD5_BDATE |
|  | +INCOME_CODE |
|  | +BIRTH_DATE |
|  | +STORE_ID |
|  | +DISTRICT_ID |
| HH_DIET | = CARD_NUM |
|  | +DIET_CODE |
| HH_PROMO_PURCH | = CARD_NUM |
|  | +PROMO_ID |
|  | +TOT_PROMO_QTY |
|  | +TOT_DIS_AMT |
|  | +TOT_PURCH_AMT |
|  | +PERIOD_START_DATE |
|  | +PERIOD_END_DATE |
| HH_PURCH_HISTORY | = CARD_NUM |
|  | +PURCH_DATE |
|  | +PURCH_AMT |
|  | +STORE_ID |
|  | +DISTRICT_ID |
| HH_PURCH_TOTALS | = CARD_NUM |
|  | +TOT_DIS_AMT |
|  | +TOT_TAX_AMT |
|  | +TOT_PURCH_AMT |
|  | +TOT_VISIT_NUM |
| INCOME CODES | = INCOME_CODE |
|  | +INC_BEG_AMT |
|  | +INC_END_AMT |
|  | +CREATE_DATE |
|  | +CREATE_USER |
| PROD_CLUSTER | = CLUSTER_ID |
|  | +CLUSTER_DESC |
|  | +CLUSTER_TYPE |
|  | +STORE_ID |
|  | +DISTRICT_ID |
|  | +CREATE_DATE |
|  | +CREATE_USER |

| Object Identifier | Component Names |
|---|---|
| PROD_MFR | = MFR_CODE |
| | +VENDOR_ID |
| | +MFR_NAME |
| | +MFR_ADD1 |
| | +MFR_ADD2 |
| | +MFR_CITY |
| | +MFR_STATE |
| | +MFR_ZIP |
| | +MFR_PHONE |
| PROD_PROMO | = UPC_CODE |
| | +PROMO_ID |
| | +PROMO_CODE |
| | +PROMO_AMT |
| | +START_DATE |
| | +END_DATE |
| | +TRACK_START_DATE |
| | +TRACK_END_DATE |
| | +TOT_SOLD_NUM |
| | +STORE_ID |
| | +DISTRICT_ID |
| | +CREATE_DATE |
| | +CREATE_USER |
| PROD_VENDER | = VENDOR_ID |
| | +VEND_NAME |
| | +VEND_ADDR1 |
| | +VEND_ADDR2 |
| | +VEND_CITY |
| | +VEND_STATE |
| | +VEND_ZIP |
| | +VEND_PHONE |
| PROMO_CODES | = PROMO_CODES |
| | +PROMO_DESC |
| | +CREATE_DATE |
| | +CREATE_USER |
| STORE_INFO | = STORE_ID |
| | +DISTRICT_ID |
| | +STORE_NAME |
| | +STORE_ADDR1 |
| | +STORE_ADDR2 |
| | +STORE_CITY |
| | +STORE_STATE |
| | +STORE_ZIP |
| | +STORE_PHONE |
| | +STORE_MGR |
| | +CREATE_DATE |
| | +CREATE_USER |
| UPC_CLUSTER | = UPC_CODE |
| | +DISTRICT_ID |
| | +STORE_ID |
| | +CLUSTER_ID |
| UPC_PRODUCT | = UPC_CODE |
| | +MFR_CODE |
| | +PROD_CODE |
| | +PROD_NAME |
| | +PROD_DESC |
| | +PROD_AMT |

The element structure definitions indicating the field length and type of each object identifer are provided in the table below.

| Object Identifier | Field Length | Type |
|---|---|---|
| APPLIC_DATE | 7 | DATE |
| APPL_CODE | 2 | CHAR |
| APPL_DESC | 30 | CHAR |
| BANK_NAME | 30 | CHAR |
| BEG_AGE_DATE | 7 | DATE |
| BEG_AGE_NUM | | NUMBER |
| BEG_HH_NUM | | NUMBER |
| BIRTH_DATE | 7 | DATE |
| CARD_CODE | 2 | CHAR |
| CARD_DESC | 30 | CHAR |
| CARD_NUM | 16 | CHAR |
| CARD_SEQ_NUM | 1 | CHAR |
| CHILD1_BDATE | 7 | DATE |
| CHILD2_BDATE | 7 | DATE |
| CHILD3_BDATE | 7 | DATE |
| CHILD4_BDATE | 7 | DATE |
| CHILD5_BDATE | 7 | DATE |
| CHILD_NUM | | NUMBER |
| CHK_ACCT_NUM | 15 | CHAR |
| CLUSTER_DESC | 30 | CHAR |
| CLUSTER_ID | 10 | CHAR |
| CLUSTER_TYPE | 2 | CHAR |
| CREATE_DATE | 7 | DATE |
| CREATE_USER | 10 | CHAR |
| DIET_CODE | 2 | CHAR |
| DIET_DESC | 30 | CHAR |
| DISTRICT_DESC | 30 | CHAR |
| DISTRICT_ID | 10 | CHAR |
| DRV_LIC_NUM | 20 | CHAR |
| DRV_LIC_STATE | 2 | CHAR |
| EMPL_ADDR1 | 30 | CHAR |
| EMPL_ADDR2 | 30 | CHAR |
| EMPL_CITY | 20 | CHAR |
| EMPL_NAME | 30 | CHAR |
| EMPL_PHONE | 16 | CHAR |
| EMPL_STATE | 2 | CHAR |
| EMPL_ZIP | 10 | CHAR |
| END_AGE_DATE | 7 | DATE |
| END_AGE_NUM | | NUMBER |
| END_DATE | 7 | DATE |
| END_HH_NUM | | NUMBER |
| FIRST_NAME | 15 | CHAR |
| GROUP_ID | 10 | CHAR |
| HH_ADDR1 | 30 | CHAR |
| HH_ADDR2 | 30 | CHAR |
| HH_CITY | 20 | CHAR |
| HH_NUM | | NUMBER |
| HH_PHONE | 16 | CHAR |
| HH_STATE | 2 | CHAR |
| HH_ZIP | 10 | CHAR |
| INCOME_CODE | 2 | CHAR |
| INC_BEG_AMT | | NUMBER |
| INC_END_AMT | | NUMBER |
| ISSUE_DATE | 7 | DATE |
| LAST_NAME | 20 | CHAR |
| MAIL_IND | 1 | CHAR |
| MFR_ADDR1 | 30 | CHAR |
| MFR_ADDR2 | 30 | CHAR |
| MFR_CITY | 20 | CHAR |
| MFR_CODE | 6 | CHAR |
| MFR_NAME | 30 | CHAR |
| MFR_PHONE | 16 | CHAR |
| MFR_STATE | 2 | CHAR |
| MFR_ZIP | 10 | CHAR |
| MID_INITIAL | 1 | CHAR |
| PERIOD_END_DATE | 7 | DATE |
| PERIOD_START_DATE | 7 | DATE |
| PROD_AMT | 5 | NUMBER |
| PROD_CODE | 6 | CHAR |
| PROD_DESC | 30 | CHAR |
| PROD_NAME | 20 | CHAR |
| PROMO_AMT | 5 | NUMBER |
| PROMO_CODE | 2 | CHAR |
| PROMO_DESC | 30 | CHAR |
| PROMO_ID | 10 | CHAR |
| PURCH_AMT | 7 | NUMBER |
| PURCH_DATE | 7 | DATE |
| PURCH_DATE1 | 7 | DATE |
| PURCH_DATE2 | 7 | DATE |
| PURCH_DATE3 | 7 | DATE |
| PURCH_DATE4 | 7 | DATE |
| PURCH_DATE5 | 7 | DATE |
| SOC_SEC_NUM | 9 | CHAR |
| START_DATE | 7 | DATE |
| STORE_ADDR1 | 30 | CHAR |
| STORE_ADDR2 | 30 | CHAR |
| STORE_CITY | 20 | CHAR |

-continued

| Object Identifier | Field Length | Type |
|---|---|---|
| STORE_ID | 10 | CHAR |
| STORE_MGR | 30 | CHAR |
| STORE_NAME | 30 | CHAR |
| STORE_PHONE | 16 | CHAR |
| STORE_STATE | 2 | CHAR |
| STORE_ZIP | 10 | CHAR |
| TOT_CLUS_QTY | | NUMBER |
| TOT_DIS_AMT | 9 | NUMBER |
| TOT_PROMO_QTY | | NUMBER |
| TOT_PURCH_AMT | 9 | NUMBER |
| TOT_SOLD_NUM | | NUMBER |
| TOT_TAX_AMT | 9 | NUMBER |
| TOT_VISIT_NUM | | NUMBER |
| TRACK_END_DATE | 7 | DATE |
| TRACK_START_DATE | 7 | DATE |
| UPC_CODE | 12 | CHAR |
| VENDOR_ID | 10 | CHAR |
| VEND_ADDR1 | 30 | CHAR |
| VEND_ADDR2 | 30 | CHAR |
| VEND_CITY | 20 | CHAR |
| VEND_NAME | 30 | CHAR |
| VEND_PHONE | 16 | CHAR |
| VEND_STATE | 2 | CHAR |
| VEND_ZIP | 10 | CHAR |

Figure 9:
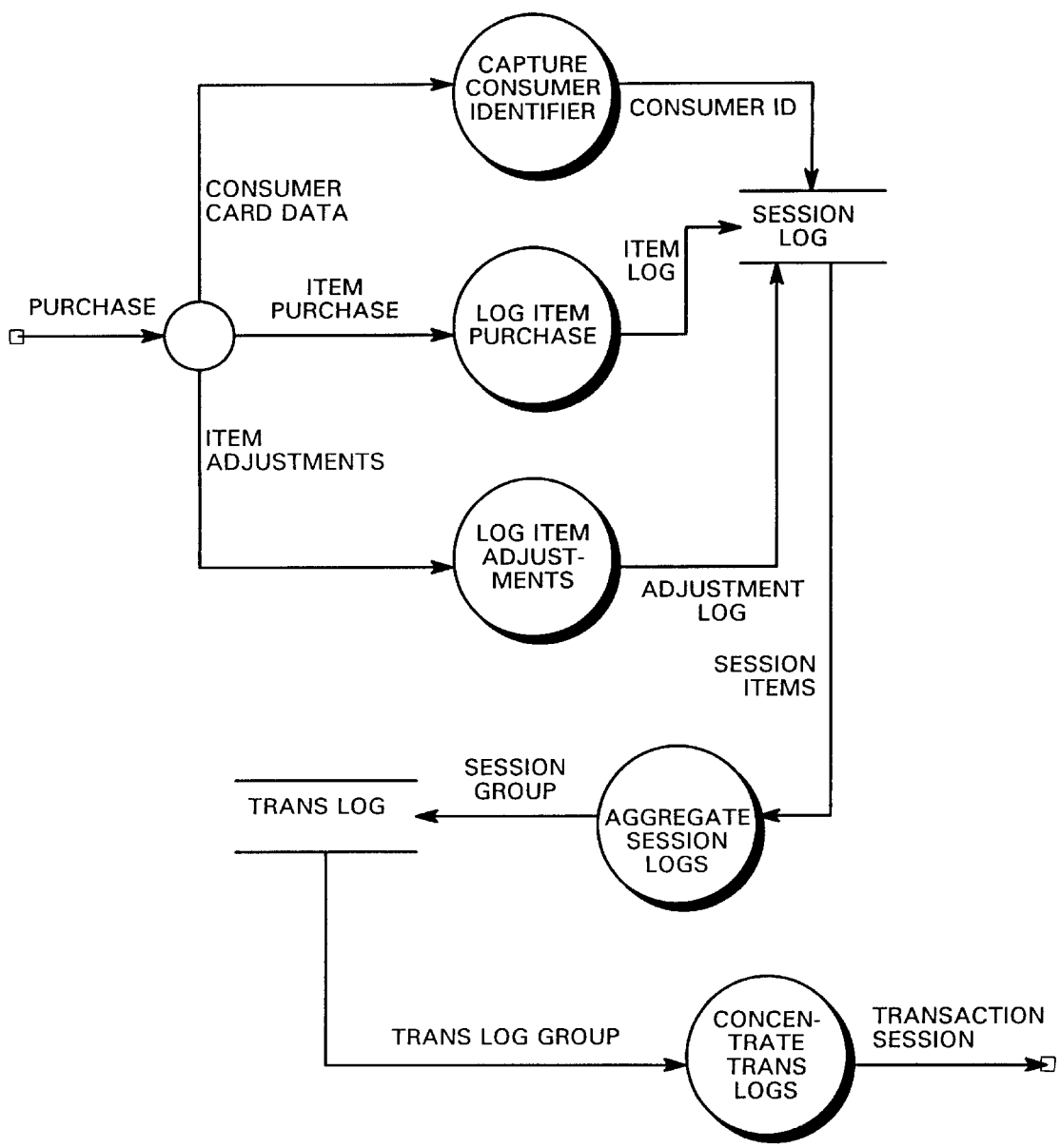
FIG. 9 is a process data flow diagram for the point of sale subsystem according to the present invention.

The retail point of sale system 20 software is symbolically illustrated in the data process flow diagram FIG. 9. Each symbol identifier is defined in the table below.

| Identifier | Type | Definition |
|---|---|---|
| FIG. 9 | Split/Merge | Breakdown of purchase transaction into purchase item components to generate transaction records. |
| TRANS LOG | Data Store | Collection of all Transaction Sessions for a given store. |
| CAPTURE CONSUMER IDENTIFIER | Data Process | Receive the scanned data from the consumer's membership card and format for the session log. |
| LOG ITEM PURCHASE | Data Process | Receive scanned data for product purchase and format for the session log. |
| LOG ITEM ADJUSTMENTS | Data Process | Receive nonitem purchase scanner data, e.g. coupons, and format for the session log. |
| AGGREGATE SESSION LOGS | Data Process | Gather and concentrate all session logs accumulated for a time period, e.g. a 24 day. Format to a single data file. |
| CONCEN-TRATE TRANS-ACTION LOGS | Data Process | Gather all session logs into one transaction log data file. |
| SESSION LOG | Data Store | |
| FLOW CONNECTIONS: | | |
| PURCHASE | Data Flow | The actual transaction between a Retail Grocer and one of their consumers. |
| TRANSACTION SESSION | Data Flow | A set of transactions representing the total "check-out" interaction between the Retail Grocer and one of their consumers at one time. Includes purchases, voids, and all other activity conducted at the POS workstation. |
| CONSUMER CARD DATA | Data Flow | Information scanned from consumer membership card. Usually just the card member number. |

-continued

| Identifier | Type | Definition |
|---|---|---|
| CONSUMER ID | Data Flow | The card member number (MIN) originating from the consumer membership card. |
| ITEM PURCHASE | Data Flow | Information related to a purchased item such as an item number, selling price, and quantity. |
| ITEM LOG | Data Flow | A consumer's item purchase represented in the session log. |
| ITEM ADJUSTMENTS | Data Flow | Consumer transactions other than an item purchase, such as voids, coupons, etc. |
| ADJUSTMENT LOG | Data Flow | A nonitem purchase transaction represented in the session log. |
| SESSION ITEMS | Data Flow | Each unit of a session log representing product purchase and other transactions. |
| SESSION GROUP | Data Flow | All sessions within a logical grouping such as for a given store over a day or week. Generally sorted by POS terminal and time. |
| TRANS LOG GROUP | Data Flow | Group of Session Groups usually for a given store over a day or week. Exists as a data file. |

Figure 10:
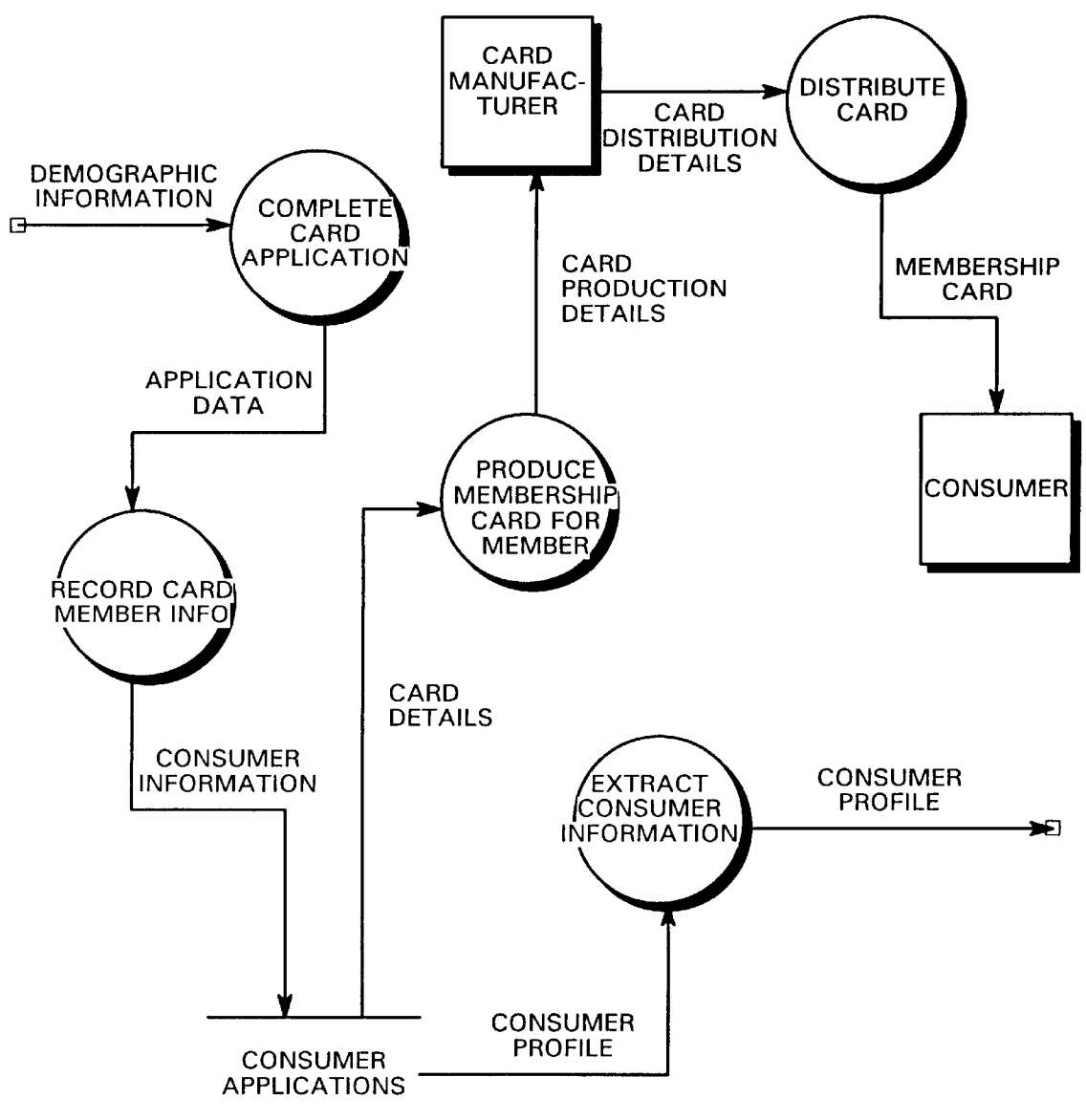
FIG. 10 is a process flow diagram for the customer application subsystem according to the present invention.

The consumer application system software is outlined in the data flow diagram of FIG. 10. The definition of each symbol identifier and each flow connection is provided in the table set forth below.

| Identifier | Type | Definition |
|---|---|---|
| RECORD CARD MEMBER INFORMATION | Data Process | Enter consumer identifying, demographic, and psychographic data from the sign-up application subsystem into database. |
| CONSUMER APPLICATIONS | Data Store | Data entry repository for new consumer applicant's data. |
| COMPLETE CARD APPLICATION | Data Process | The consumer, along with store assistant completes the sign-up application and assigns unique MIN. |
| CARD MANUFACTURER | External Entity | The facility that produces the physical card and mailer to provide the consumer with the membership package. |
| PRODUCE CARD | Data Process | Extract the information required to produce and deliver consumer a membership card. |
| EXTRACT CONSUMER INFORMATION | Data Process | Extract all identifying demographic, and psychographic information and format into an interface file for communication/ delivery to the Frequent Shopper Database. Can optionally provide complete database for new consumers. |
| DISTRIBUTE CARD | Data Process | Receive the completed new consumer membership set (including card) and send to consumer. |
| CONSUMER | External Entity | The Retailer's consumer. |
| FLOW CONNECTIONS: | | |
| CARD DETAILS | Data Flow | Data items required to produce the consumer membership package including the card. |

| Identifier | Type | Definition |
|---|---|---|
| APPLICATION DATA | Data Flow | All data items included on the consumer sign-up application form. |
| CONSUMER PROFILE | Data Flow | The interface to the database containing the consumer demographic and psychographic information aggregated in the Consumer Applications subsystem. |
| CONSUMER INFORMATION | Data Flow | Consumer sign-up information data as required by the entry process to the consumer applications subsystem. |
| DEMOGRAPHIC INFORMATION | Data Flow | Information provided by the Retailer's consumer on the sign-up application. Includes demographic and psychographic data. |

Figure 11:
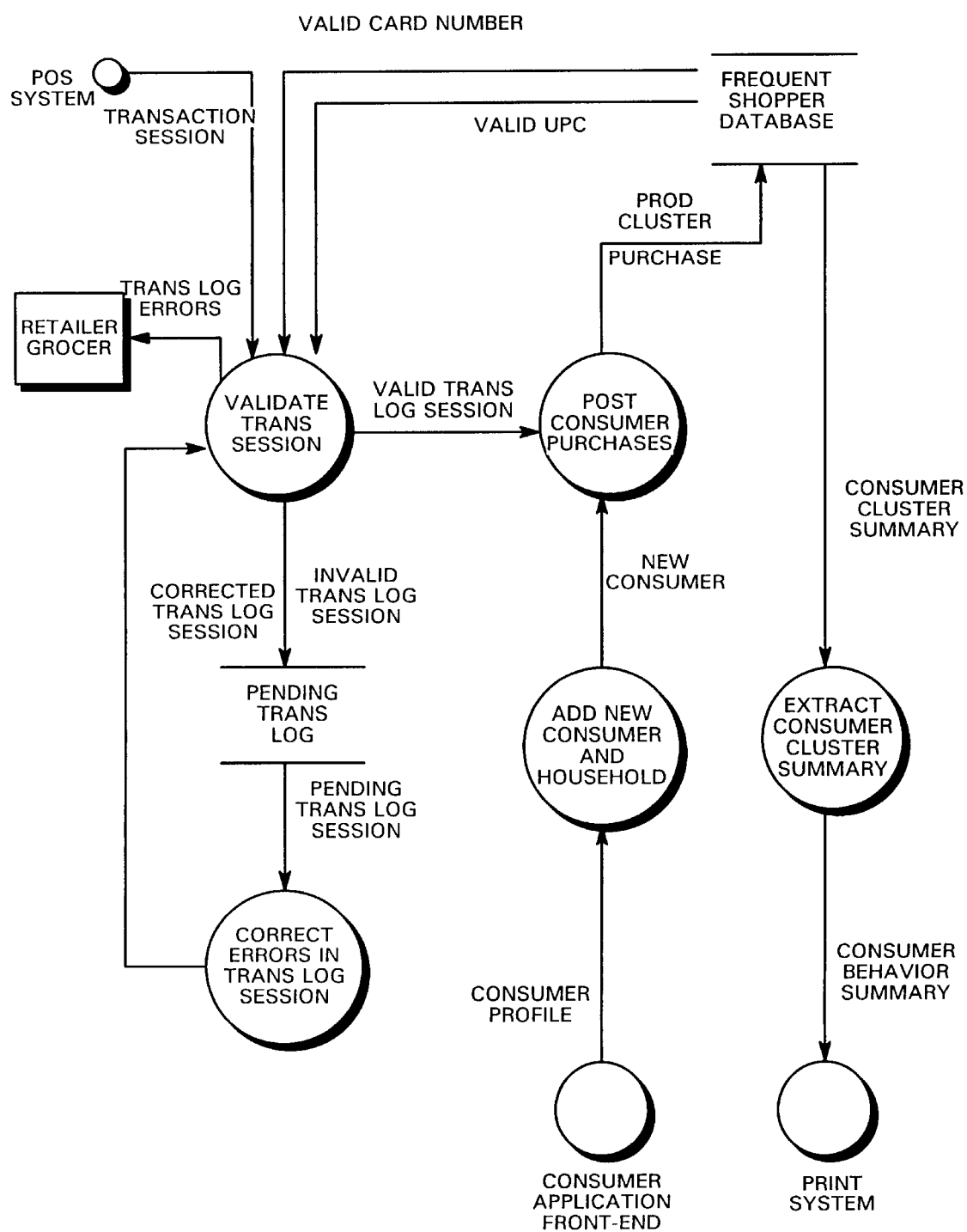
FIG. 11 is a data flow diagram of a consumer purchase repository subsystem according to the present invention.
Figure 12A:
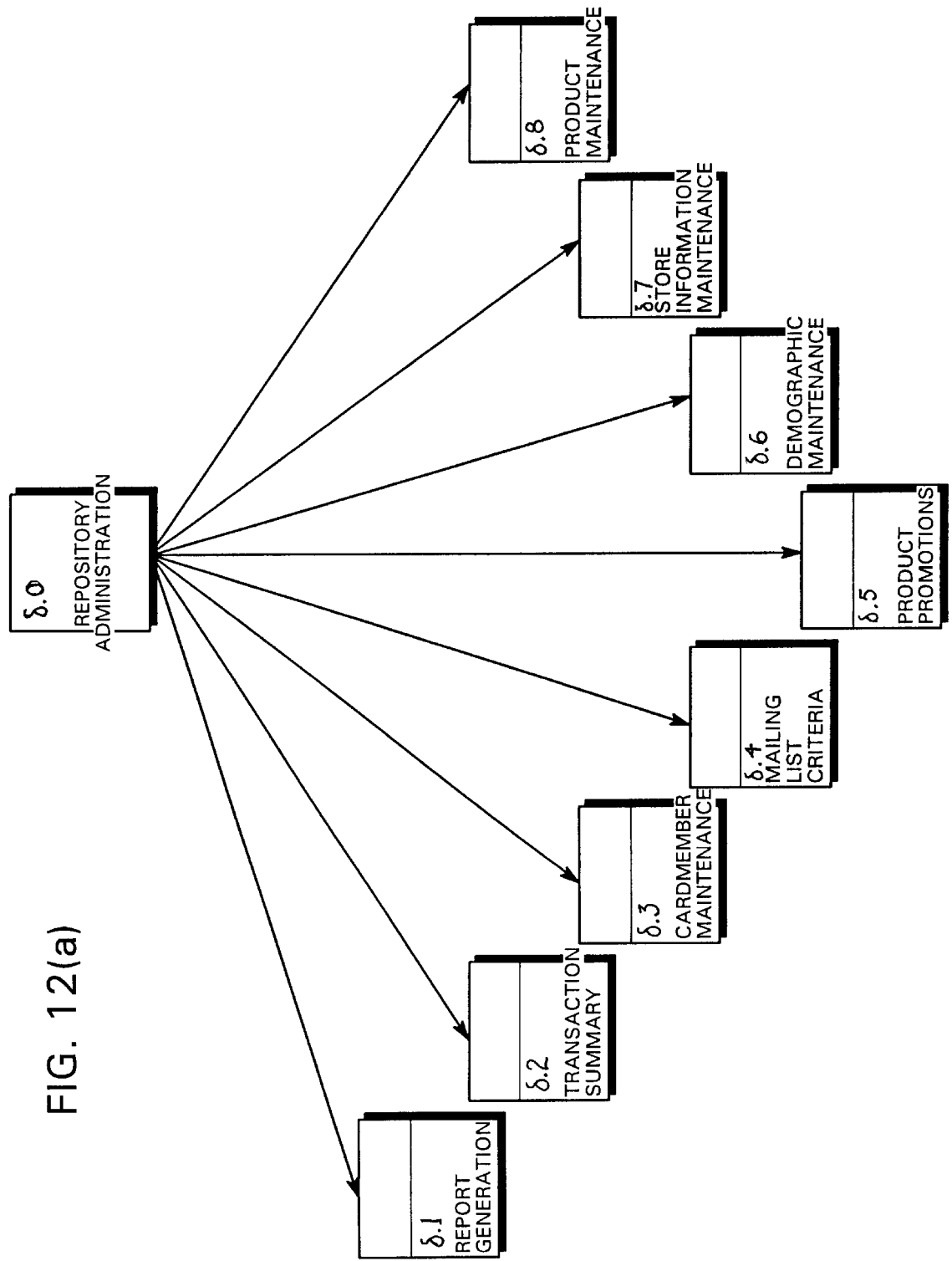
Figure 12B:
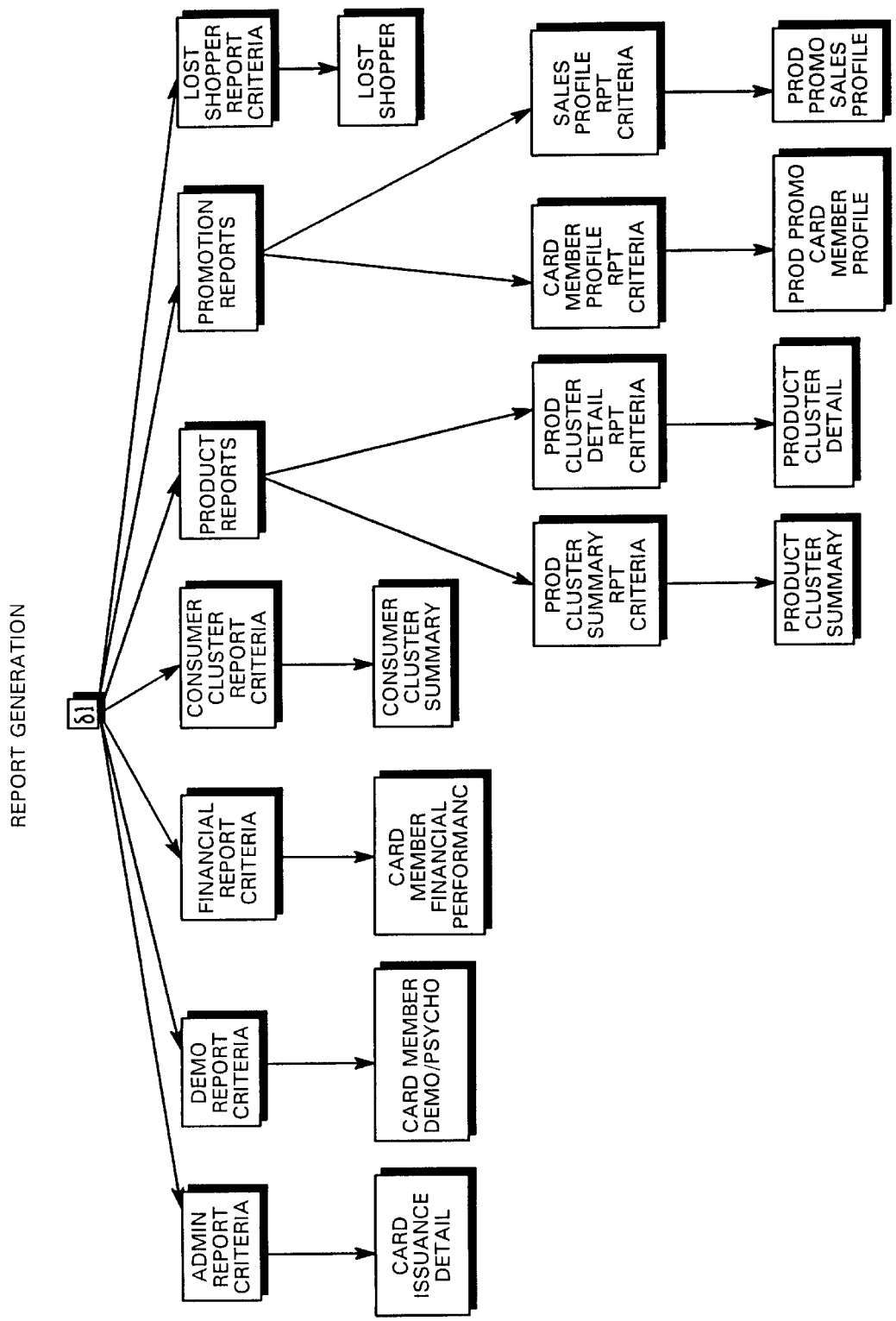

FIG. 11 shows a process data flow for transactions with the consumer product purchase repository. Definitions for the symbol and flow connection identifiers are provided in the table below.

| Identifier | Type | Definition |
|---|---|---|
| RETAILER | External Entity | Retailer business entity. |
| VALIDATE TRANSACTION | Data Process | Receive transaction session log from POS system and validate the session. |
| PENDING TRANS LOG | Data Store | Transaction log session that is invalid. Held for correction, then released for posting. |
| CORRECT ERRORS | Data Process | Make necessary corrections to rejected transaction log session. Usually a problem with consumer card number. |
| POST CONSUMER PURCHASES | Data Process | Scan valid transaction log session, determine product cluster purchases and post to database. |
| ADD NEW CONSUMER | Data Process | Accept new application consumer information from consumer application subsystem and add to database. |
| FREQUENT SHOPPER DATA BASE | Data Store | Main repository for consumer characteristics and product purchase history. Relational database serving as repository for consumer and product information. |
| EXTRACT CONSUMER CLUSTER SUMMARY | Data Process | Extracts information required by the print analysis subsystem. |
| FLOW CONNECTIONS: | | |
| INVALID TRANS LOG SESSION | Data Flow | |
| VALID TRANS LOG SESSION | Data Flow | |
| TRANSACTION SESSION | Data Flow | |
| VALID CARD NUMBER | Data Flow | |
| CONSUMER PROFILE | Data Flow | |
| CONSUMER BEHAVIOR SUMMARY | Data Flow | |
| PROD CLUSTER PURCHASE | Data Flow | |
| PENDING TRANS LOG SESSION | Data Flow | |
| CORRECTED TRANS LOG SESSION | Data Flow | |
| VALID UPC | Data Flow | |
| TRANS LOG ERRORS | Data Flow | |
| NEW CONSUMER | Data Flow | |
| CONSUMER CLUSTER SUMMARY | Data Flow | |

FIGS. 12(a)–12(i) are self-explanatory illustrating various kinds of repository administration reports, activities, and functions that may be performed using the present invention.

Figure 13:
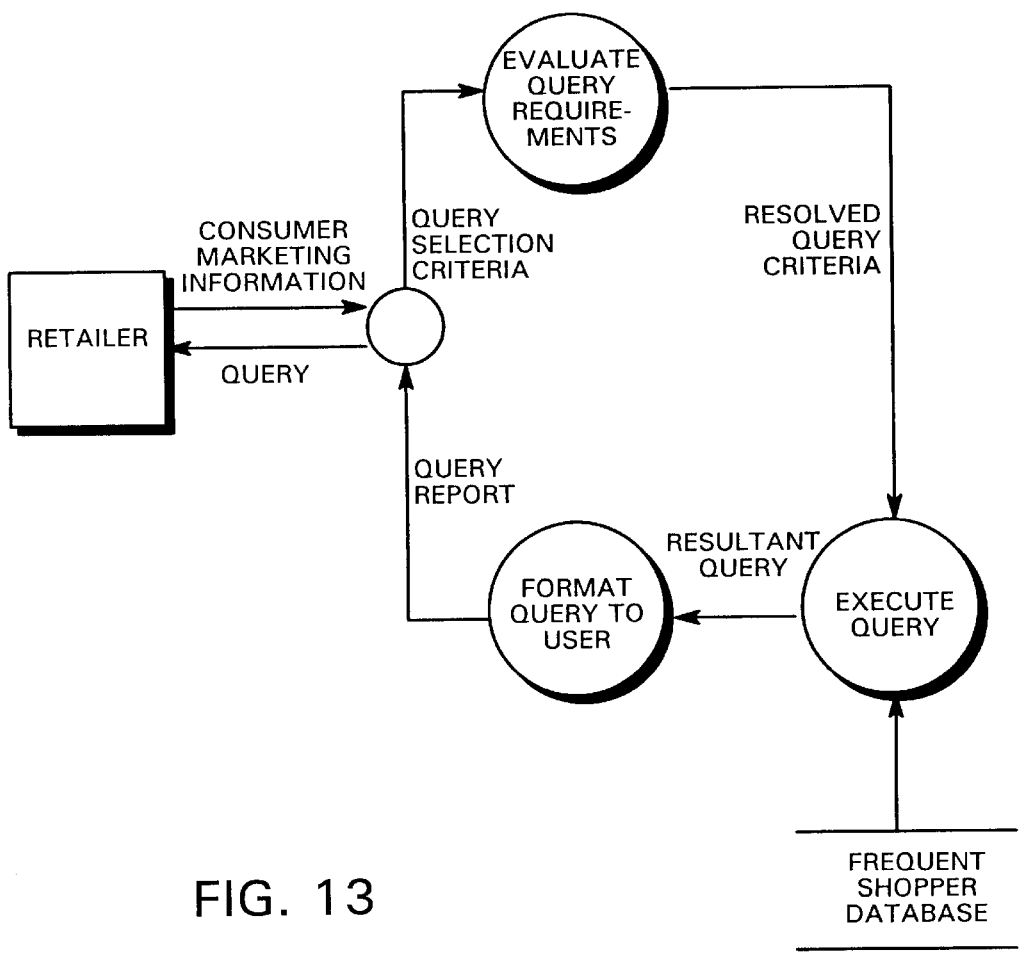
FIG. 13 is a data flow diagram of exemplary program control processes performed by the user interface subsystem for detailed implementation according to the present invention.

A process flow diagram for user interface between a retailer and the frequent shopper database is illustrated in FIG. 13. Definitions of the symbols and flow connections are provided in the table set forth below.

| Definition | Identifier | Type |
|---|---|---|
| RETAILER | External Entity | Retailer business entity. |
| EVALUATE QUERY | Data Process | Parse, analyze, and format query request from user. |
| FORMAT QUERY | Data Process | Receives resultant data from query and presents to user. |
| EXECUTE QUERY | Data Process | Takes query criteria and accesses database for required information. |
| FREQUENT SHOPPER DATABASE | Data Store | Main repository for consumer characteristics and product purchase history. |

| Identifier | Type |
|---|---|
| FLOW CONNECTIONS: | |
| CONSUMER MARKETING INFORMATION -- QUERY | Data Flow |
| QUERY SELECTION CRITERIA | Data Flow |
| QUERY REPORT | Data Flow |
| RESOLVED QUERY CRITERIA | Data Flow |
| RESULTANT QUERY | Data Flow |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. Moreover, while various examples have been described in the retail grocery context, the present invention may be employed in any retail, wholesale, or consumer service or sales environment.

What is claimed is:

1. A method for electronically processing using electronic data processing circuitry transactional information involving plural consumer products and consumers, comprising:

gathering and storing in electronic memory product and consumer information including identifying a consumer and one or more products purchased by said consumer;

grouping in said electronic memory by said electronic data processing circuitry said consumer information into M different consumer clusters, M being an integer greater than one, using different sets of consumer criteria, where consumers in each of the M consumer clusters have in common one of the sets of consumer criteria, grouping in said electronic memory by said electronic data processing circuitry said product information into N different product clusters, N being an integer greater than one, using different sets of characteristics, where products in each of the N product clusters have in common one of the sets of characteristics;

analyzing with said electronic data processing circuitry product transactions made by said consumers using said M consumer clusters and said N product clusters to determine cluster relationships between specific ones of said M consumer clusters and said N product clusters;

determining consumer buying habits including specific types of products in which a consumer is interested using said cluster relationships; and preparing customized newsletters, the substantive content of one of the customized newsletters being personalized specifically for a specific one of the M consumer clusters and said specific types of products determined for that specific consumer cluster in the determining step.

2. The method according to claim 1, wherein the number of products substantially exceeds the number of N product clusters.

3. The method according to claim 1, wherein said product and consumer information includes product transactions and consumer parameters that define personal characteristics about each consumer including demographics and consumer preferences, respectively, said method further comprising:

maintaining a relational database for storing product transaction information, consumer parameters, said M consumer clusters and said N product clusters.

4. The method according to claim 3, further comprising the steps of:

querying said database with one of said sets of consumer criteria to define one of said M consumer clusters;

accumulating data relating to said one consumer cluster from said database in response to said query; and outputting said accumulated data.

5. The method according to claim 3, further comprising:

modifying said database based on changing market conditions, and querying said modified database with one of said sets of consumer criteria; and modifying one or more of said consumer clusters based on specific consumer buying patterns, habits, demographics, cultural backgrounds obtained in the querying step.

6. The method according to claim 1, wherein said grouping step includes:

assigning product codes to a corresponding product cluster, and summarizing product transactional data using corresponding product cluster information.

7. The method according to claim 1, wherein said analyzing step includes:

determining characteristics of consumers purchasing products included in particular ones of said N product clusters.

8. The method according to claim 1, said analyzing step further comprising:

analyzing product promotions using transactional information relating to said product clusters.

9. The method according to claim 1, further comprising:

issuing a membership card to each consumer including consumer demographic information which is processed during product transactions involving the consumer.

10. A method for electronically processing using electronic data processing circuitry transactional information involving plural consumer products and consumers, comprising:

gathering and storing in electronic memory product and consumer information including an identification of a consumer, personal characteristics of the consumer including demographic information, and one or more products purchased by said consumer;

grouping in said electronic memory by said electronic data processing circuitry said consumer information into M different consumer clusters, M being an integer greater than one, using different sets of consumer criteria, where consumers in each of the M consumer clusters have in common one of the sets of consumer criteria, grouping in said electronic memory by said electronic data processing circuitry said product information into N different product clusters, N being an integer greater than one, using different sets of characteristics, where products in each of the N product clusters have in common one of the sets of characteristics;

maintaining a relational database for storing transactional, consumer cluster, and product cluster information;

using the relational database, analyzing with the electronic data processing circuitry product transactions made by said consumers using said M consumer and N product clusters to determine one or more relationships between one of the M consumer clusters and a certain one of the N product clusters;

generating customized informational materials for consumers in the one consumer cluster, where the content of the customized informational materials includes information that is only relevant to the one or more relationships determined for consumers in the one consumer cluster and to the personal characteristics of consumers in the one consumer cluster; and distributing the customized informational materials to consumers in the one consumer cluster.

11. The method according to claim 10, wherein the number of consumers is substantially larger than the number M consumer clusters.

12. The method according to claim 10, wherein said purchase transactions are stored and analyzed in terms of said clusters.

13. The method according to claim 10, further comprising:
   modifying said selected parameters defining consumer clusters without changing said received consumer information, and
   analyzing said purchase transactions in terms of said modified selected parameters.

14. The method according to claim 10, further comprising:
   determining purchasing behavior of consumers based on queries to said relational database.

15. The method according to claim 10, further comprising:
   issuing a membership card to each consumer including consumer demographic information which is processed during product transactions involving the consumer.

16. A method for electronically monitoring promotional and advertising efforts using electronic storage and data processing circuitry, wherein the electronic processing circuitry performs the steps comprising:
   generating a product database associating each product of a plurality of related products into N different product clusters, N being an integer greater than one, using different sets of characteristics, where products in each of the N product clusters have in common one of the sets of characteristics;
   generating a consumer database associating each of plural consumers into M different consumer clusters, M being an integer greater than one, using different sets of consumer criteria, where consumers in each of the M consumer clusters have in common one of the sets of consumer criteria,
   monitoring sales of products in one of the N product clusters for a predetermined time period;
   initiating a promotional campaign for the specific products in the one product cluster during said time period; and
   analyzing said promotional campaign after said time period using said sales of products in the one product cluster to consumers in one or more of the M consumer clusters.

17. The method according to claim 16, further comprising:
   issuing a membership card to each consumer including consumer demographic information which is processed during product transactions involving the consumer.

18. A method for electronically processing retail transactional information using a computer involving plural products and consumers, comprising the computer-implemented and automatically performed steps of:
   receiving product information uniquely identifying a specific product;
   grouping said product information into M different product categories, M being an integer greater than one, using different sets of product characteristics, where products in each of the M product categories have in common one of the sets of product characteristics;
   receiving consumer information describing consumer characteristics including demographic characteristics of said consumers;
   grouping said consumers into N different consumer categories, N being an integer greater than one, using different sets of consumer characteristics, where consumers in each of the N consumer categories have in common one of the sets of consumer characteristics,
   analyzing retail transactions using both the M product and N consumer categories to determine product preference relationships between consumers from one of the N consumer categories and products from one of the M product categories;
   printing promotional literature where the content of the promotional literature is adapted so as to be directed to the consumer characteristics of the consumers from the one consumer category and to the products in the one product category using said product preference relationships; and
   directly mailing said promotional literature to the consumers from the one consumer category.

19. The method according to claim 18, further comprising:
   storing said retail transactions information in a database, and
   updating said database with current transactional, product, and consumer information for subsequent data retrieval and processing.

20. The method according to claim 18, further comprising:
   issuing a membership card to each consumer including consumer demographic information which is processed during product transactions involving the consumer.

21. A system for optimizing retail marketing operations based on purchase transactions of consumer products, comprising:
   a relational database;
   means for receiving consumer identifying data including consumer demographic data and product data;
   means for grouping said consumer identifying data into M different consumer clusters, M being an integer seater than one using different sets of consumer criteria, where consumers in each of the M consumer clusters have in common one of the sets of consumer criteria, and product data into N product clusters, N being an integer greater than one, using different sets of characteristics, where products in each of the N product clusters have in common one of the sets of characteristics;
   means for storing said consumer and product cluster information corresponding to the M consumer clusters and the N product clusters in said relational database;
   means for analyzing said M consumer clusters and N product clusters to determine buying behaviors of consumers and establishing a relationship between products from a specific one of the N product clusters and consumers from a specific one of the M consumer clusters; and
   printing means connected to said analyzing means for printing personalized promotional information including a personalized newsletter directed specifically to consumers from the one consumer cluster, wherein the content of the personalized promotional information is directed specifically to the products from the one product cluster and personal characteristics of the consumers from the one consumer cluster.

22. The system according to claim 21, further comprising:
point of sale terminals for recording consumer purchase transactions including transmission means for transmitting transactional information from said point of sale terminals to said means for receiving.

23. The system according to claim 22, wherein said point of sale terminals include code readers for detecting coded consumer and product information.

24. The system according to claim 22, wherein said code readers optically detect said coded information.

25. The system according to claim 22, wherein said point of sale terminals are remotely located at retail sales stores, said system further comprising:
a supervisory retail processor for receiving transactional data from plural point of sales terminals including:
memory for storing a master product list containing valid product codes;
means for checking product codes included in said transactional data against said master product list to ensure valid product codes; and
means, connected to said means for checking, for transmitting validated transactional data and a list of product codes determined not to be on said master product list to said receiving means.

26. The system according to claim 21, further including a user interface terminal used by a retailer to query information from said database.

27. The system according to claim 26, wherein said queries relate to one, some or all of the purchasing behaviors of consumers, promotional efforts for particular products, and common characteristics of consumers purchasing particular products.

28. The system according to claim 21, further comprising:
means for gathering consumer demographics data;
means for encoding said consumer demographics data into digital format; and
means for providing said encoded consumer data to said receiving means.

29. The system according to claim 28, wherein said consumer identifying data includes one or more of consumer demographics, health concerns, and product preferences.

30. The system according to claim 28, wherein membership cards are issued to consumers which include a coded identifier for uniquely identifying a consumer and identifying data associated with that consumer, said cards being read by said means for receiving.

31. The system according to claim 30, wherein a dynamic memory and a microprocessor are included on said membership cards for storing consumer identification data and for restricting access to that identification data unless an authorization code is first received by the microprocessor.

32. The system according to claim 30, further comprising:
point of sale terminals remotely located at retail stores for detecting a consumer coded identifier and associating that identifier with products purchased by that consumer.

33. The system according to claim 21, wherein said printing means includes:
means for storing packages of print information, each package having different contents relating to consumer products, and
means for selecting certain ones of said print packages to be included in said customized promotional information to be printed based on cluster information.

34. The system according to claim 21, wherein said promotional literature includes advertisements, and the content and layout of said advertisements are selected for said consumers by said printing means to be primarily directed to products preferred by said consumers.

35. The system according to claim 21, wherein said promotional literature includes newsletters and the content and layout of said newsletters are selected for particular consumers.

36. The system according to claim 21, wherein said promotional literature includes coupons selected for particular consumers.

37. The system according to claim 21, further comprising:
means for directly mailing said customized information only to said particular consumers based on said particular consumers' demographics and buying behaviors.

38. A system for processing information, comprising:
an electronic device for receiving product information identifying specific products and consumer information identifying personal characteristics of consumers who purchase said products, and
electronic data processing circuitry for performing the tasks of:
grouping said consumer information into M different consumer clusters, M being an integer greater than one, using different sets of consumer criteria, where consumers in each of the M consumer clusters have in common one of the sets of consumer criteria;
grouping said product information into N different product clusters, N being an integer greater than one, using different sets of characteristics, where products in each of the N product clusters have in common one of the sets of characteristics;
analyzing transactions where products are purchased by said consumers using said N product clusters and said M consumer clusters to determine relationships between various ones of the M consumer clusters and N product clusters;
determining product preferences of said consumers according to said relationships; and
providing consumers in one of the M consumer clusters having similar product preferences with marketing or informational literature including a newsletter, the content of the newsletter specifically addressing said product preferences and personal characteristics of said consumers in the one consumer cluster.

39. The system according to claim 38, wherein said electronic input device includes a relational database for storing transactional, product cluster, and consumer cluster information, said electronic data processing circuitry further performing the task of:
determining purchasing behaviors of consumers using the relational database.

40. The system according to claim 39, further comprising:
a user interface for querying said relational database based on selected criteria, wherein product cluster data are accumulated from said database based on a user-generated query, and
an output device for outputting said accumulated data.

41. The system according to claim 39, said electronic data processing circuitry further performing the task of:
modifying said relational database based on changing market conditions and querying said modified relational database to extract specific consumer buying patterns, habits, demographics, cultural backgrounds, or other personal characteristics.

42. A system for processing transactions involving plural products and consumers, comprising:

a product database associating products in M different product clusters, M being an integer greater than one, using different sets of characteristics, where products in each of the M product clusters have in common one of the sets of characteristics;

a consumer database associating into consumer clusters consumers in N different consumer clusters, N being an integer greater than one, using different sets of consumer criteria, where consumers in each of the N consumer clusters have in common one of the sets of consumer criteria including demographics or other variables that identify individual characteristics about specific consumers;

an electronic data processor analyzing said transactions using the M product clusters and the N consumer clusters to determine a relationship between consumers in one of the N consumer clusters and particular products in one of the M product clusters to establish a product cluster preference for consumers in the one consumer cluster;

a printer printing personalized promotional literature directed to consumers in said one consumer cluster, the content of said promotional literature describing features relevant to the relationship between said consumers in one consumer cluster and the particular products in the one product cluster; and means for directly mailing said promotional literature to said consumers in said one consumer cluster.

* * * * *